(12) United States Patent
Georgas et al.

(10) Patent No.: US 9,768,881 B2
(45) Date of Patent: Sep. 19, 2017

(54) DEVICES AND TECHNIQUES FOR INTEGRATED OPTICAL DATA COMMUNICATION

(71) Applicant: Massachusetts Institute of Technology, Cambridge, MA (US)

(72) Inventors: Michael Stephen Georgas, Cambridge, MA (US); Jason Scott Orcutt, Somerville, MA (US); Vladimir Marko Stojanovic, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 18 days.

(21) Appl. No.: 14/648,002

(22) PCT Filed: Mar. 15, 2013

(86) PCT No.: PCT/US2013/032559
§ 371 (c)(1),
(2) Date: May 28, 2015

(87) PCT Pub. No.: WO2014/084894
PCT Pub. Date: Jun. 5, 2014

(65) Prior Publication Data
US 2015/0311982 A1 Oct. 29, 2015

Related U.S. Application Data

(60) Provisional application No. 61/731,028, filed on Nov. 29, 2012.

(51) Int. Cl.
*H04B 10/00* (2013.01)
*H04B 10/60* (2013.01)
(Continued)

(52) U.S. Cl.
CPC ........ *H04B 10/60* (2013.01); *H04B 10/2504* (2013.01); *H04B 10/697* (2013.01)

(58) Field of Classification Search
CPC ... H04B 10/60; H04B 10/2504; H04B 10/697
See application file for complete search history.

(56) References Cited

U.S. PATENT DOCUMENTS 3,611,292 A * 10/1971 Brown .................... G06K 9/18
101/369
4,561,117 A * 12/1985 Kuhn ........................ H04J 7/00
398/141

(Continued)

FOREIGN PATENT DOCUMENTS

WO WO 2005/013517 A2 2/2005

OTHER PUBLICATIONS

International Search Report and Written Opinion mailed May 31, 2013 for Application No. PCT/US2013/032559.

(Continued)

*Primary Examiner* — Danny Leung
(74) *Attorney, Agent, or Firm* — Wolf, Greenfield & Sacks, P.C.

(57) ABSTRACT

Devices and techniques for integrated optical data communication. An optical receiver may include a photodetector and a differential amplifier. The photodetector is coupled to an optical waveguide. The optical waveguide is configured to provide an optical signal encoding data. A first terminal of the differential amplifier is coupled to receive a photodetection signal from the photodetector. A second terminal of the differential amplifier is coupled to receive, from a noise measurement unit, a reference signal representing a noise component of the photodetection signal. The differential amplifier is configured to provide an amplifier signal encoding at least some of the data.

20 Claims, 21 Drawing Sheets

(51) Int. Cl.
*H04B 10/69* (2013.01)
*H04B 10/25* (2013.01)

(56) References Cited

U.S. PATENT DOCUMENTS

| | | | | |
|---|---|---|---|---|
| 4,831,662 A * | 5/1989 | Kuhn | ............................ | H04J 7/00 370/527 |
| 5,644,418 A * | 7/1997 | Woodward | ............ | H04B 10/803 250/214 A |
| 6,414,298 B1 * | 7/2002 | Nakajima | ................ | H01L 31/12 250/214 AL |
| 7,157,681 B1 * | 1/2007 | Tetzlaff | .................... | H01J 43/04 250/205 |
| 7,499,740 B2 * | 3/2009 | Nordstrom | .......... | A61B 5/14551 600/323 |
| 2003/0025562 A1 * | 2/2003 | Andreou | ................. | H03F 3/082 330/308 |
| 2003/0189997 A1 * | 10/2003 | Shanbhag | .......... | H04L 25/03878 375/348 |
| 2003/0189998 A1 * | 10/2003 | Phanse | ............... | H04B 10/6971 375/348 |
| 2005/0135729 A1 * | 6/2005 | Welch | ..................... | B82Y 20/00 385/14 |
| 2008/0002993 A1 * | 1/2008 | Kirkpatrick | ............ | H04B 10/67 398/202 |
| 2008/0054391 A1 * | 3/2008 | Apsel | ...................... | H01L 27/14 257/462 |
| 2008/0069199 A1 * | 3/2008 | Chen | ................. | H04L 25/03057 375/233 |
| 2009/0232196 A1 * | 9/2009 | Sunaga | ............. | H04L 25/03057 375/233 |
| 2010/0027709 A1 * | 2/2010 | Kim | .................. | H04L 25/03312 375/287 |
| 2010/0060562 A1 * | 3/2010 | Hadwen | ................ | H01L 31/153 345/102 |
| 2011/0211842 A1 * | 9/2011 | Agazzi | ............... | H04B 10/6971 398/141 |
| 2011/0217045 A1 * | 9/2011 | Watson | .............. | G02B 6/12002 398/79 |
| 2012/0224868 A1 * | 9/2012 | Proesel | ............. | H04B 10/6971 398/208 |
| 2013/0216241 A1 * | 8/2013 | Proesel | .................. | H04B 10/69 398/213 |
| 2013/0294782 A1 * | 11/2013 | Liboiron-Ladouceur | ........... | H04B 10/616 398/202 |
| 2015/0311982 A1 * | 10/2015 | Georgas | ............... | H04B 10/697 398/212 |

OTHER PUBLICATIONS

International Preliminary Report on Patentability mailed Jun. 11, 2015 for Application No. PCT/US2013/032599.
Ackert et al., Silicon-on-insulator microring resonator defect-based photodetector with 3.5-GHz bandwidth, Journal of Nanophotonics, 2011:5;059507. 6 pages.
Georgas et al., A Monolithically-Integrated Optical Receiver in Standard 45-nm SOI. IEEE. Sep. 2011:407-410.
Georgas et al., A Monolithically-Integrated Optical Receiver in Standard 45-nm SOI. IEEE. Jul. 2012;47(7):1693-1702.

* cited by examiner

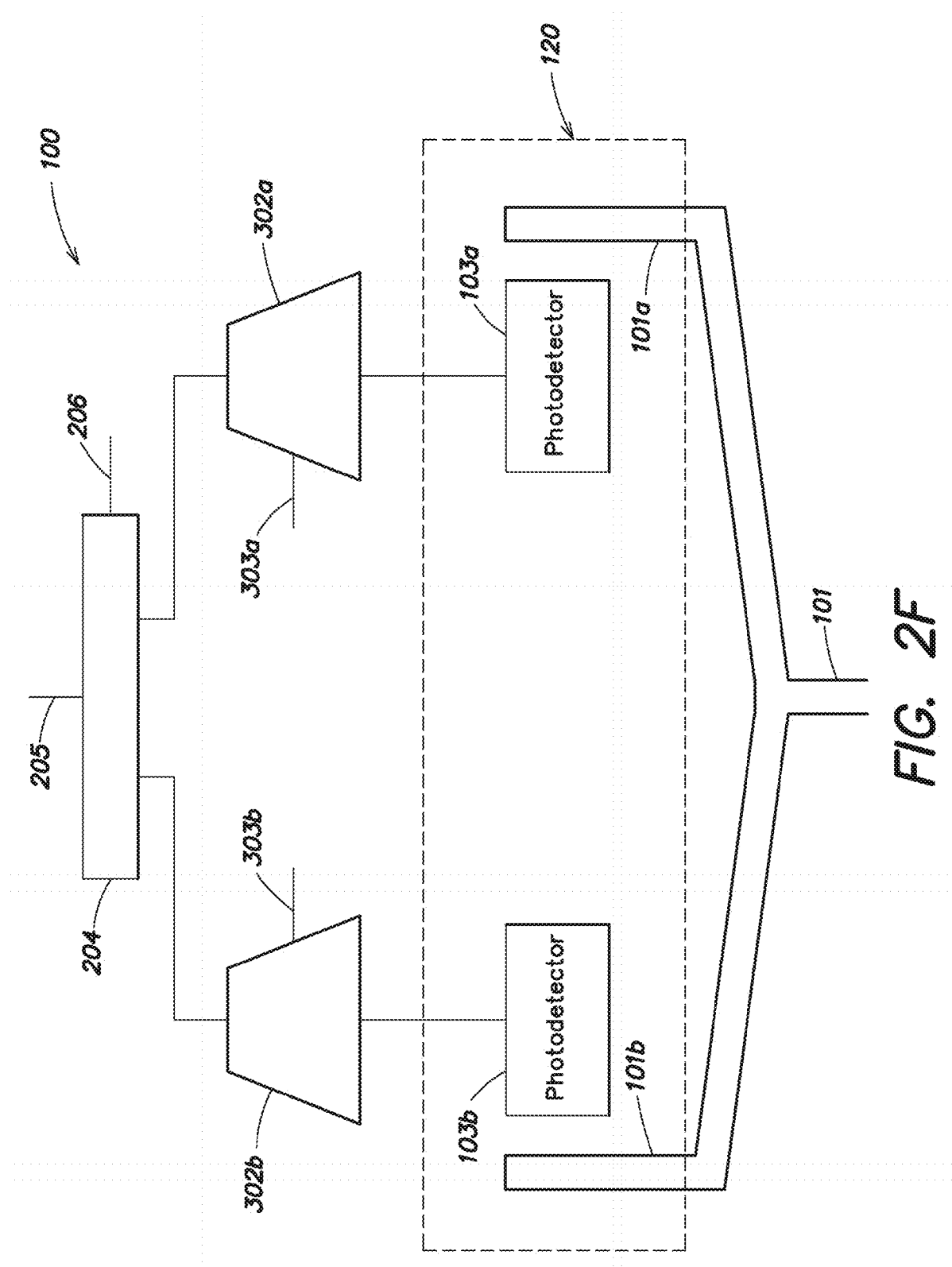

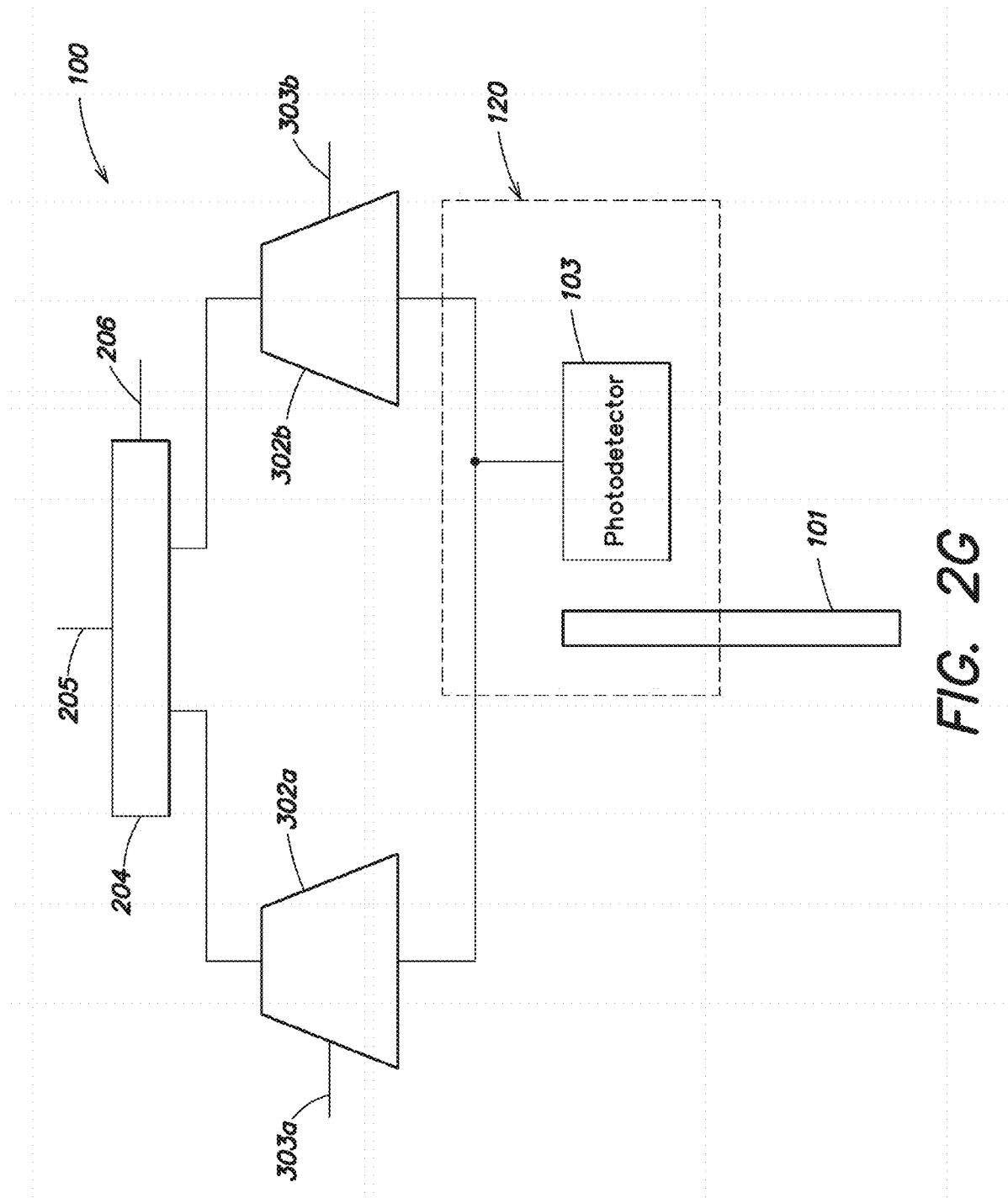

DEVICES AND TECHNIQUES FOR INTEGRATED OPTICAL DATA COMMUNICATION

CROSS-REFERENCE TO RELATED APPLICATIONS

This application is a U.S. National Stage of PCT/US2013/032559, filed Mar. 15, 2013, and titled "Devices and Techniques for Integrated Optical Data Communication," which claims the benefit under 35 U.S.C. §119(e) of U.S. Provisional Patent Application Ser. No. 61/731,028, filed Nov. 29, 2012, and titled, "Integrated Data-Receiver for High-Throughput Optical Links," each of which is hereby incorporated herein by reference in its entirety.

STATEMENT REGARDING FEDERALLY SPONSORED RESEARCH OR DEVELOPMENT

This invention was made with Government support under Grant No. W911NF-10-1-0412 awarded by the Army Research Office, under Grant No. ECCS-0844994 awarded by the National Science Foundation, and under Contract No. HR0011-11-C-0100 awarded by the Defense Advanced Research Projects Agency. The Government has certain rights in the invention.

BACKGROUND

1. Field

The techniques and devices described herein relate generally to integration of optical data communication technology and electronic circuits, and relate particularly to an optical receiver which is suitable for use with integrated silicon photonic interconnect technology and is compatible with a standard CMOS process.

2. Discussion of the Related Art

Many electronic devices use one or more integrated circuits to receive, store, process, and/or send data. An integrated circuit ("IC" or "chip") may include a wafer of semiconductor material, such as silicon, on which one or more electronic circuits have been fabricated by applying a sequence of processing steps to the semiconductor wafer. These processing steps may include, for example, photolithographic patterning, material deposition, doping, annealing, material removal, and cleaning. For reasons that are understood by one of ordinary skill in the art (e.g., power dissipation, scalability, and/or cost of manufacturing), many ICs are fabricated using a standard CMOS (complementary metal-oxide semiconductor) manufacturing process, rather than a customized CMOS process or a non-CMOS process.

An electronic or optoelectronic device may use data communication technology to move data from one location to another within the device, or to exchange data with another device. A variety of data communication technologies are known, including electrical and optical technologies. Electrical data communication technologies may transport data by propagating electrical signals through metal interconnects (e.g., wires). Optical data communication technologies may transport data by propagating optical signals (e.g., light) through optical interconnects (e.g., waveguides).

Optical data communication technologies that propagate optical signals through a silicon medium are known as silicon photonic systems. In a silicon photonic system, the plasma dispersion effect may be used to control the concentration of free charge carriers in a semiconductor device, thereby modulating the light carried by a nearby optical waveguide. The concentration of free-carriers may be controlled by carrier injection, carrier depletion, or carrier accumulation techniques.

Although silicon's refractive index is only weakly dependent on the concentration of free charge carriers, a ring resonator structure for enhancing this dependence is known See, for example, Lipson, Nature 2004, p. 1082. Use of such a ring resonator structure may facilitate low-power optical modulation in silicon.

An optical data communication system may include an optical modulator and an optical receiver. An optical modulator may encode data in an optical signal by modulating one or more of the signal's properties, such as its phase, amplitude, frequency, or polarization. Such modulation may be achieved by changing an optical property of the waveguide through which the optical signal propagates, such as the waveguide's absorption coefficient or refractive index.

An optical receiver may convert an optical signal into an electrical signal. Optical-to-electrical signal conversion may be performed using a photodetector, such as a photodiode. A photodiode may produce an electrical signal (e.g., a current) in response to an optical signal that passes through or near the photodiode. Some photodiodes may produce not only a photocurrent (e.g., a current indicative of the intensity of the detected optical signal) but also a dark current (e.g., a current indicative of thermal generation or leakage processes intrinsic to the photodiode and independent of any optical signal illuminating the photodiode).

An optical receiver's performance may be characterized using various performance metrics, such as data rate (e.g., the amount of data that can be received in a given time period, sometimes expressed in Gb/s), energy dissipation (e.g., the amount of energy dissipated by the receiver per amount of data received, sometimes expressed in fJ/bit), and sensitivity (e.g., the minimum input current that can be reliably detected by the portion of the optical receiver circuit that is downstream from the photodetector(s), sometimes expressed in μA).

BRIEF SUMMARY

The foregoing summary is provided by way of illustration and is not intended to be limiting.

Some embodiments provide for an optical receiver comprising a photodetector and a differential amplifier. The photodetector is coupled to an optical waveguide. The optical waveguide is configured to provide an optical signal encoding data. A first terminal of the differential amplifier is coupled to receive a photodetection signal from the photodetector. A second terminal of the differential amplifier is coupled to receive, from a noise measurement unit, a reference signal representing a noise component of the photodetection signal. The differential amplifier is configured to provide an amplifier signal encoding at least some of the data.

Other embodiments provide for a method comprising converting at least a portion of an optical signal to an electrical signal; determining a difference between the electrical signal and a reference signal representing a noise component of the electrical signal; comparing the difference to one or more threshold levels; and providing at least a portion of a data signal based on a result of comparing the difference to the one or more threshold levels.

Still other embodiments provide for an optical receiver comprising a photodetection circuit and an amplification circuit. The photodetection circuit is coupled to an optical waveguide. The optical waveguide is configured to provide an optical signal. The amplification circuit includes a first amplifier and a second amplifier. The first amplifier is configured to provide a first amplifier signal based on a first photodetection signal provided by the photodetection circuit. The first photodetection signal corresponds to a first portion of the optical signal. The first portion of the optical signal encodes a first bit. The second amplifier is configured to provide a second amplifier signal based on a second photodetection signal provided by the photodetection circuit. The second photodetection signal corresponds to a second portion of the optical signal. The second portion of the optical signal encodes a second bit. The amplification circuit is configured to provide an electrical data signal encoding the first and second bits.

Still other embodiments provide for a method comprising obtaining a first electrical signal and a second electrical signal, the first electrical signal corresponding to a first portion of the optical signal, the second electrical signal corresponding to a second portion of the optical signal; with a first amplifier, providing a first amplifier signal based on the first electrical signal, the first amplifier signal encoding a first bit; with a second amplifier, providing a second amplifier signal based on the second electrical signal, the second amplifier signal encoding a second bit; and providing a data signal including the first amplifier signal and/or the second amplifier signal.

BRIEF DESCRIPTION OF THE DRAWINGS

The accompanying drawings are not necessarily drawn to scale. Like elements are identified by the same or like reference designations when practical. For purposes of clarity, not every component may be labeled in every drawing. In the drawings:

FIGS. 2A-2G show schematics of optical receivers 100 which include aspects of the optical receiver illustrated in FIG. 1A and/or the optical receiver illustrated in FIG. 1B, according to some embodiments;

Figure 7A:
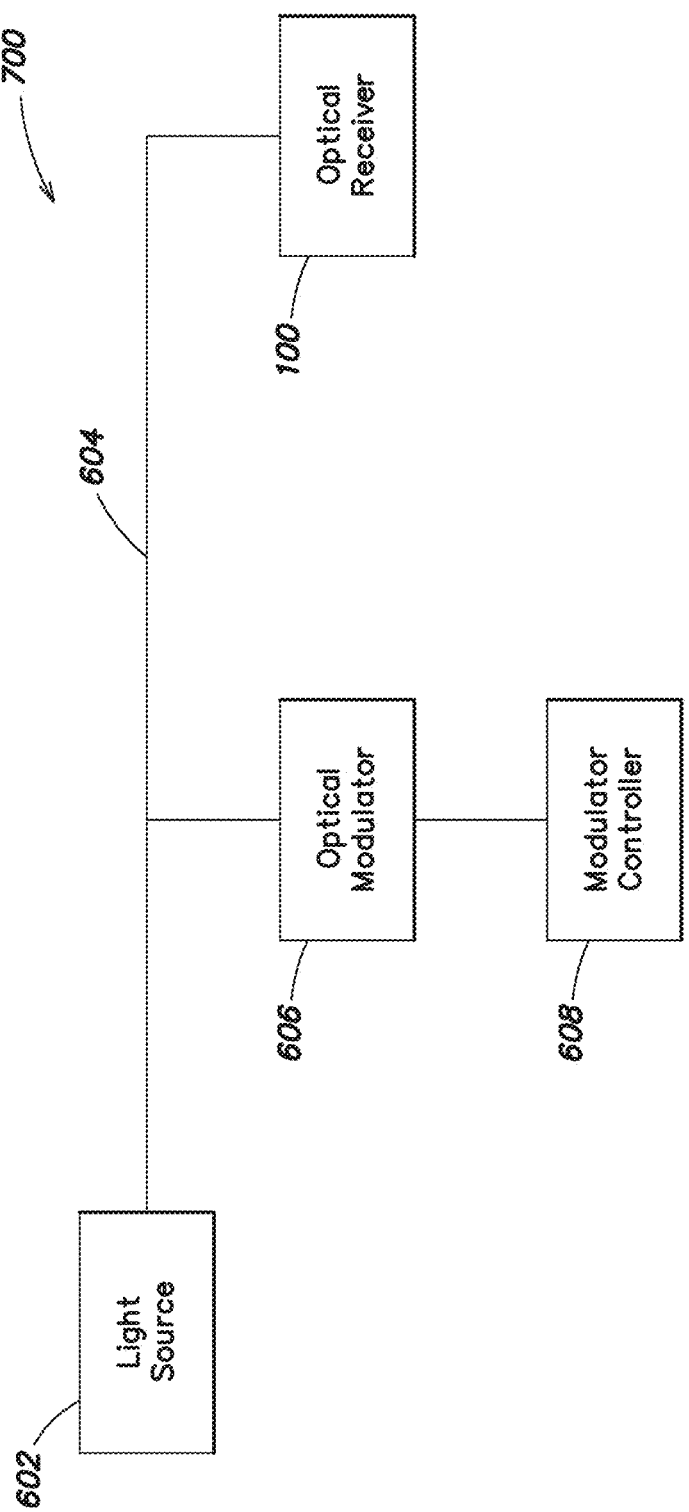
Figure 7B:
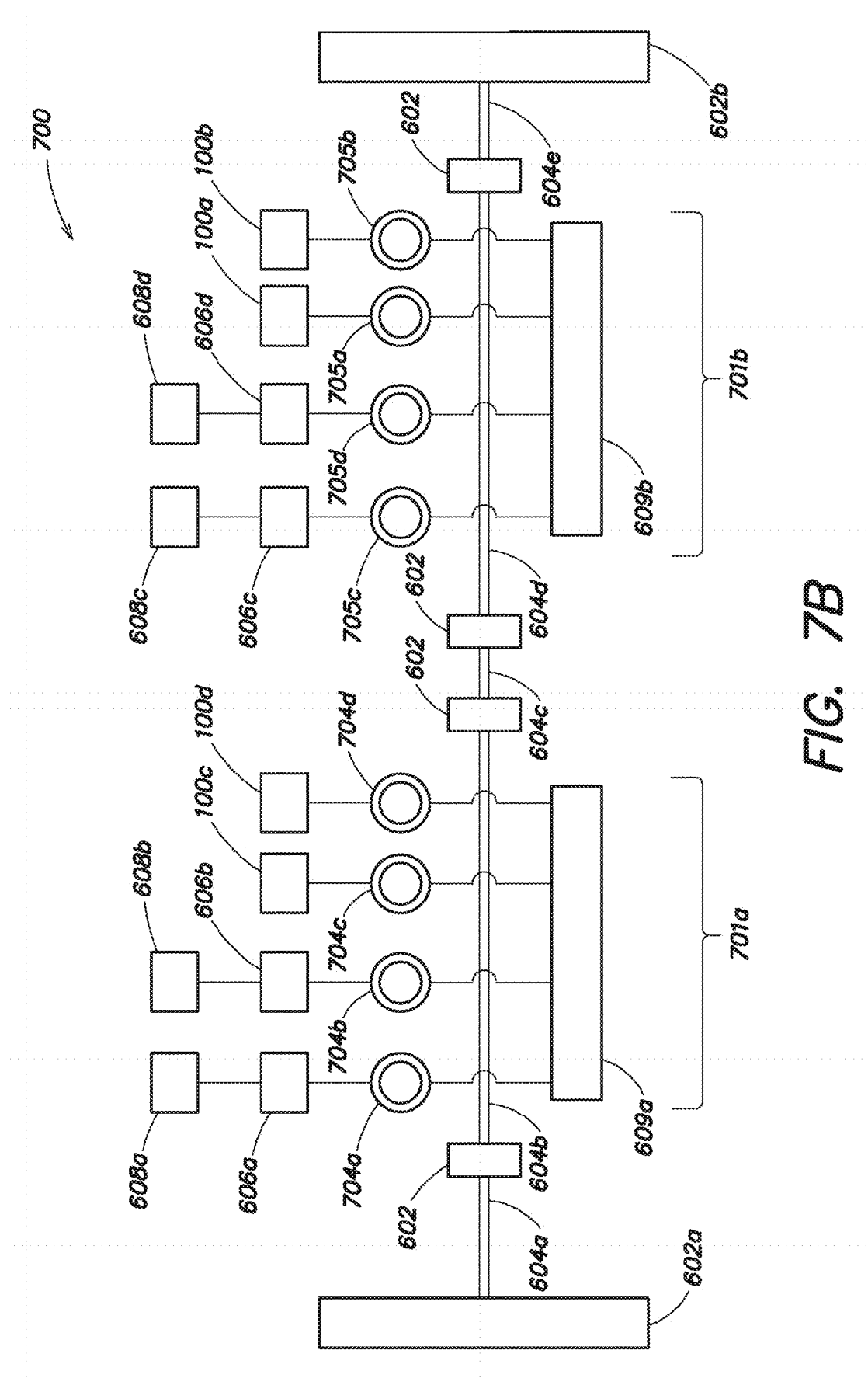
Figure 8A:
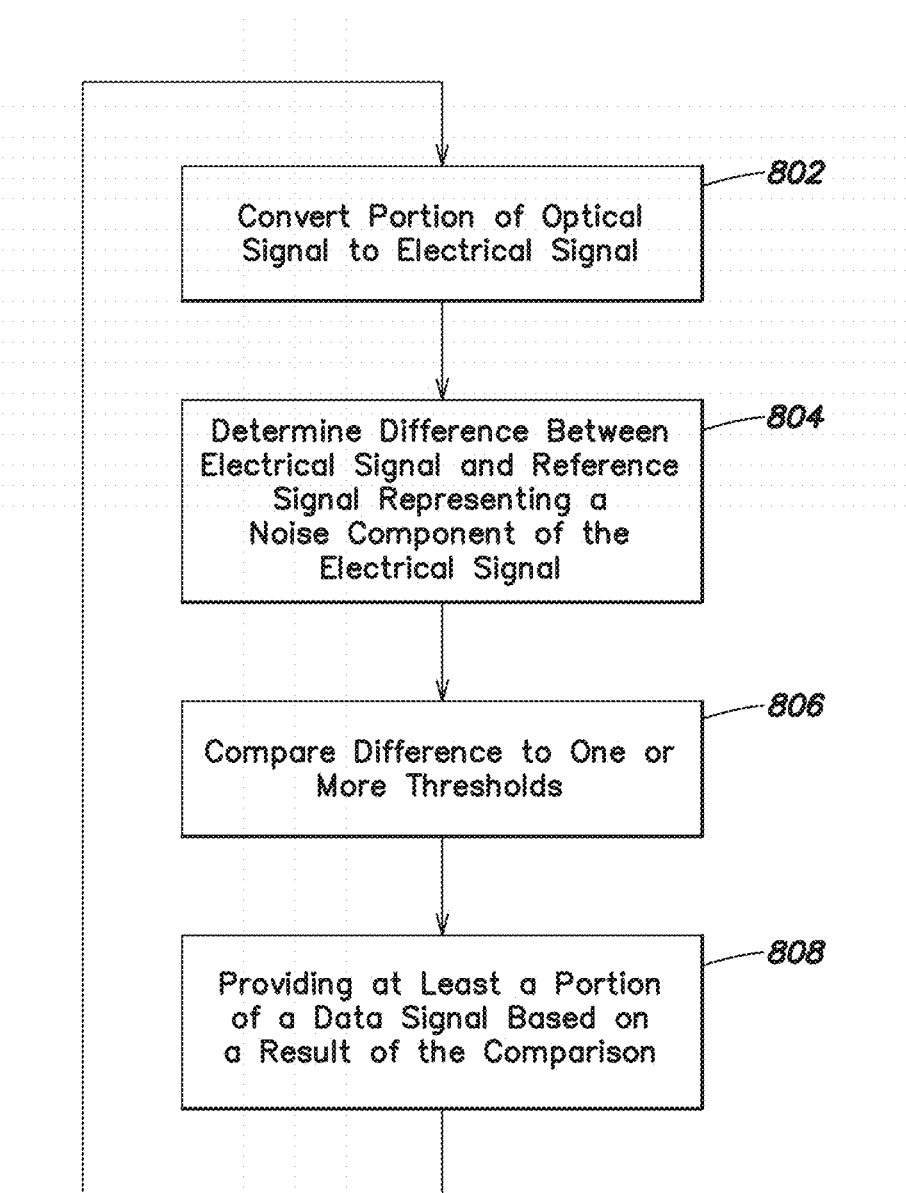
Figure 8B:
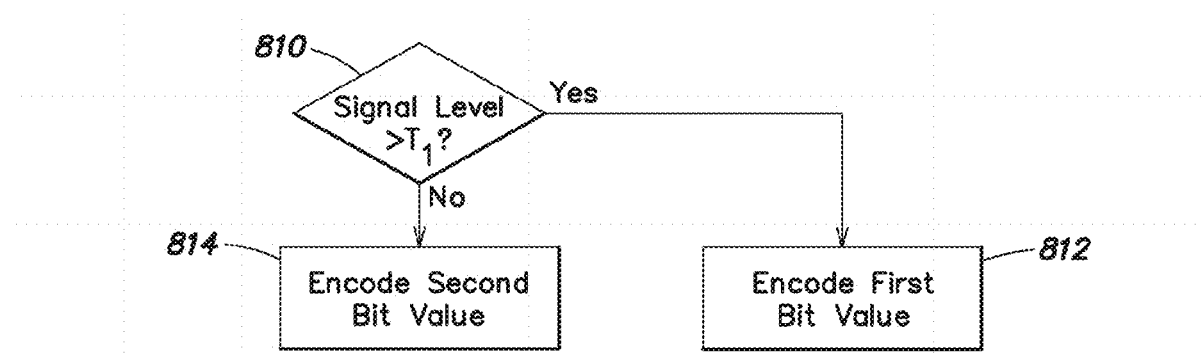
Figure 8C:
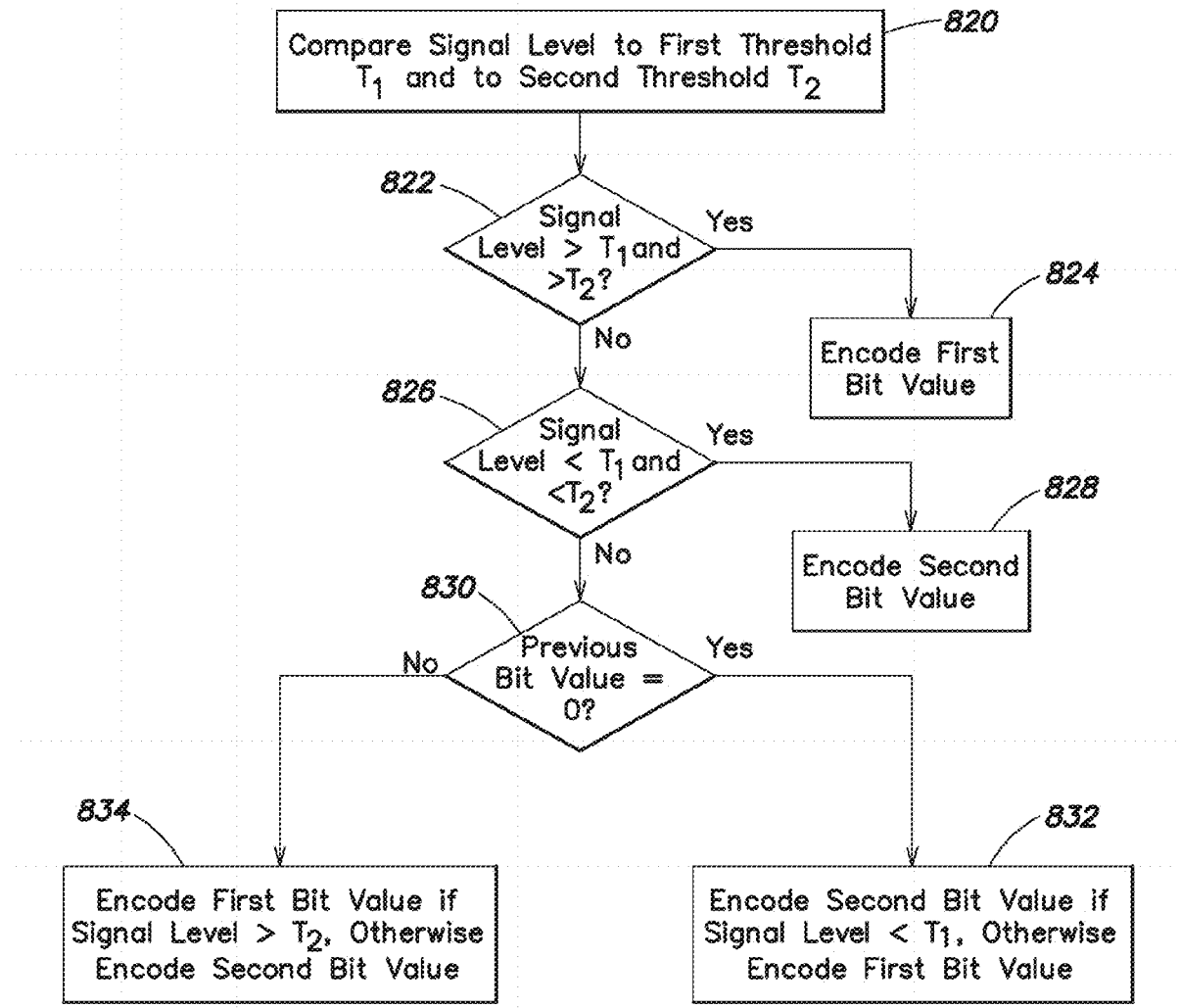
Figure 9:
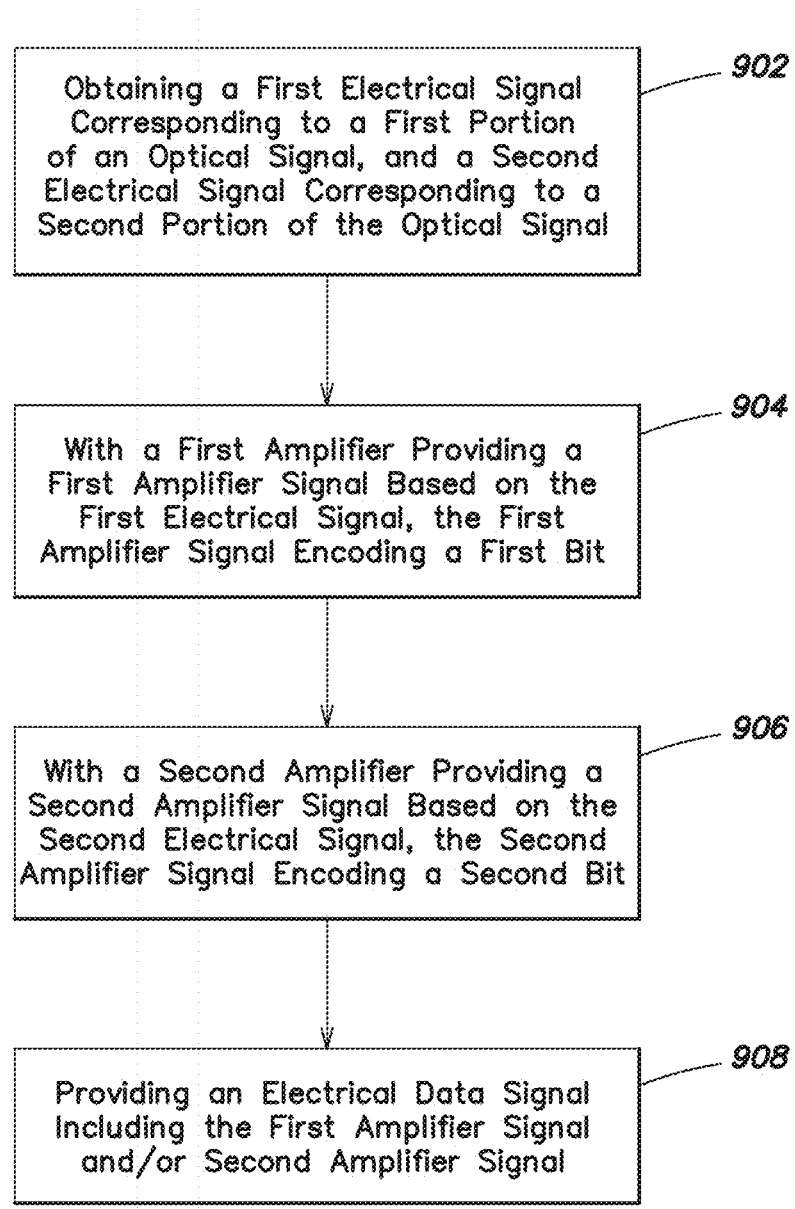

Each of FIGS. 6A-6E show a schematic of a differential amplifiers 202, according to some embodiments;

FIG. 7A shows a block diagram of an optical data communication system 700, according to some embodiments;

FIG. 7B shows a schematic of an optical data communication system 700, according to some embodiments;

FIG. 8A shows a flowchart of a method of converting optical data to electrical data, according to some embodiments;

Each of FIGS. 8B and 8C show a flowchart of a method of providing a data signal based on a result of comparing an electrical signal level to one or more threshold levels, according to some embodiments; and FIG. 9 shows a flowchart of a method of converting optical data to electrical data, according to some additional embodiments.

DETAILED DESCRIPTION OF EMBODIMENTS

The inventors have appreciated a need for monolithically integrated optical data communication technology, and a particular need for integrated optical data communication technology that is compatible with standard CMOS processes. Techniques are needed for increasing the communication bandwidth and reducing the power dissipation of integrated circuits (ICs). Integrated optical data communication technologies—which may provide higher communication bandwidth and reduced power dissipation than the electrical data communication technologies used by conventional ICs—have been proposed. However, some previously proposed techniques for integrating optical data communication technologies into integrated circuits (ICs) rely on hybrid or heterogeneous integration rather than monolithic integration. Also, in terms of energy dissipation, previously proposed integrated optical data communication systems are not competitive with conventional electrical data communication systems.

The inventors have appreciated a need for optical receivers that support a high data rate, low energy dissipation, and high sensitivity. The inventors have further appreciated that the data rate, energy dissipation, and/or sensitivity of an optical receiver may be improved by using multiple photodetectors to convert an optical signal into an electrical signal. As just one example, the inventors have appreciated that a dummy photodetector (e.g., an extra photodetector that is isolated from the optical signal of interest) may be advantageously used to cancel out a noise component (e.g., a dark current) of the signal produced by a photodetector that is coupled to the optical signal of interest. The inventors have further appreciated, contrary to conventional wisdom, that integrating amplifiers may perform better than transimpedance amplifiers in optical receivers where the photodetectors are tightly coupled to the amplifiers.

The features described above, as well as additional features, are described further below. These features may be used individually, all together, or in any combination of two or more, as the technology is not limited in this respect.

Figure 1A:
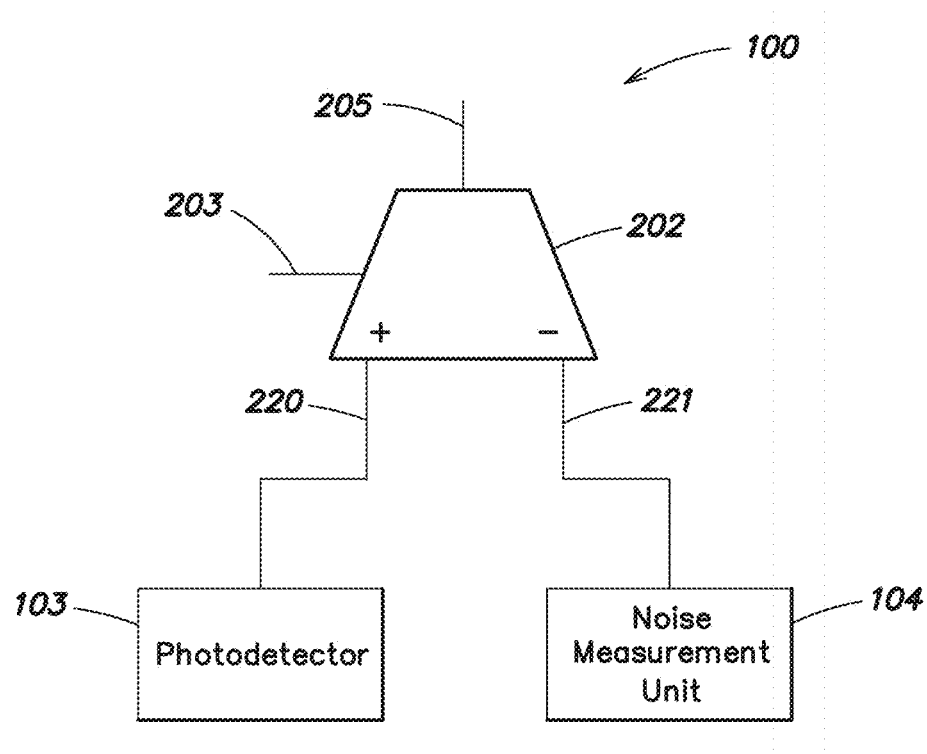
FIG. 1A shows a block diagram of an optical receiver 100, according to some embodiments.

FIG. 1A shows a block diagram of an optical receiver 100, according to some embodiments. Embodiments of optical receiver 100 of FIG. 1A may convert optical signals encoding data into electrical signals encoding the same data. In the example of FIG. 1A, optical receiver 100 includes a differential amplifier 202, a photodetector 103, and a noise measurement unit 104. An output of photodetector 103 is coupled (e.g., directly or indirectly connected) to an input terminal 220 of differential amplifier 202 (e.g., a non-inverting input terminal). An output of noise measurement unit 104 is coupled (e.g., directly or indirectly connected) to another input terminal of differential amplifier 202 (e.g., an inverting input terminal 221). Differential amplifier 202 provides, at output terminal 205, a signal that represents the difference between the signal provided by photodetector 103 and the signal provided by noise measurement unit 104.

Embodiments of photodetector 103 may include any device known to one of ordinary skill in the art or otherwise suitable for converting an optical signal into an electrical signal, including but not limited to a photodiode, a photogate, a phototransistor, or a photoresistor. In preferred embodiments, photodetector 103 may be a PN-junction photodiode or a PIN photodiode. In some embodiments, photodetector 103 may be coupled to an optical waveguide, and may convert optical signals propagating through the optical waveguide into electrical signals (e.g., voltages or currents). The electrical signals produced by photodetector 103 may be indicative of data encoded in the optical signals. The electrical signals provided by some embodiments of photodetector 103 may include a noise component, which may include a dark current, signals arising from crosstalk between the photodetector and other device components, signals arising from power supply coupling between the photodetector and a power supply, and/or signals arising from any other optical or electrical source of interference. In some embodiments, the noise component may include any common-mode signal provided by photodetector 103 (e.g., any signal that is not a photocurrent and/or is provided by similar photodetectors that are not coupled to receive the optical signals received by photodetector 103, irrespective of the signal's source). In some embodiments, a signal to noise ratio (e.g., the signal to dark current noise ratio) of the electrical signal provided by photodetector 103 may be relatively low. Some embodiments of photodetector 103 are shown in FIGS. 4A-5B and discussed in detail below.

Embodiments of noise measurement unit 104 may include any device known to one of ordinary skill in the art or otherwise suitable for providing a signal indicative of a noise component of an electrical signal produced by a photodetector. In some embodiments, noise measurement unit 104 may provide a signal indicative of a noise component (e.g., a dark current noise component) of the electrical signal produced by photodetector 103.

In some embodiments, noise measurement unit 104 may include a photodetector similar to photodetector 103. For example, the photodetector of noise measurement unit 104 may be of the same type as photodetector 103 (e.g., a photodiode), may have the same structure as photodetector 103 (e.g., a PN-junction), may be fabricated with the same materials and/or dimensions as photodetector 103, and/or may be located near photodetector 103 (e.g., near enough that one of ordinary skill in the art would expect photodetector 103 and the photodetector of noise measurement unit 104 to be exposed to similar semiconductor process variations). In some embodiments, an intrinsic capacitance of noise measurement unit 104 may match an intrinsic capacitance of photodetector 103 (e.g., the deviation of the capacitance seen at an output terminal of noise measurement unit 104 from the capacitance seen at an output terminal of photodetector 103 may be between 0% and 20%, between 0% and 10%, between 0% and 5%, or preferably between 0% and 2%). Matching the capacitances of photodetector 103 and noise measurement unit 104 may enhance the performance of amplifier 202.

Embodiments of noise measurement unit 104 are not limited by the noise measurement unit's structure or components. In some embodiments, noise measurement unit 104 may include a photodetector that is not similar to photodetector 103. In some embodiments, noise measurement unit 104 may include any circuit configured to provide an electrical signal indicative of a noise component of the electrical signal produced by photodetector 103, including but not limited to a voltage source or current source configured to reproduce a measured, estimated, or calculated value of the dark current noise component of the electrical signals provided by photodetector 103.

Figure 6A:
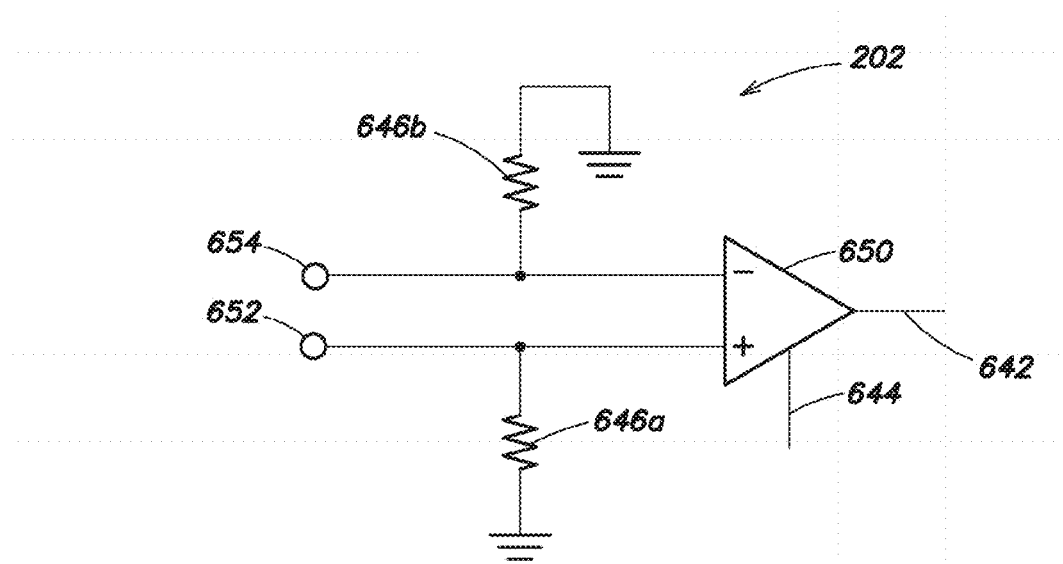
Figure 6B:
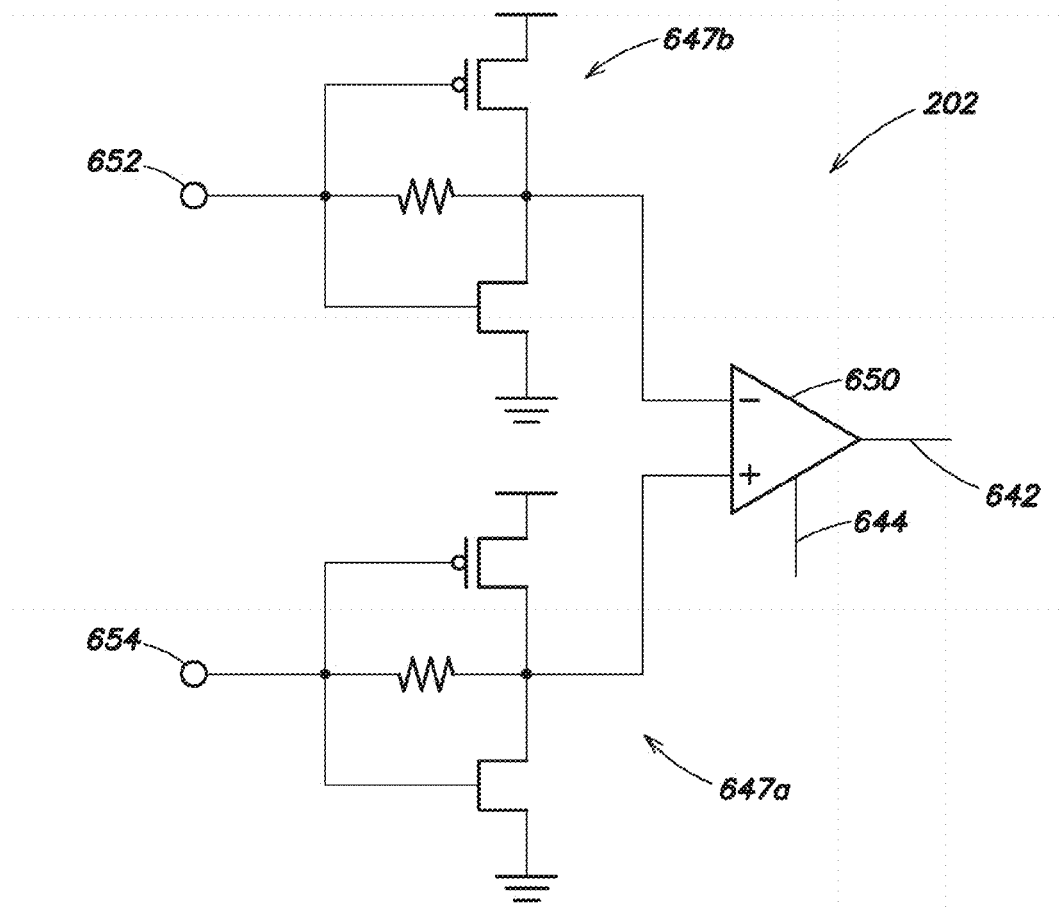
Figure 6C:
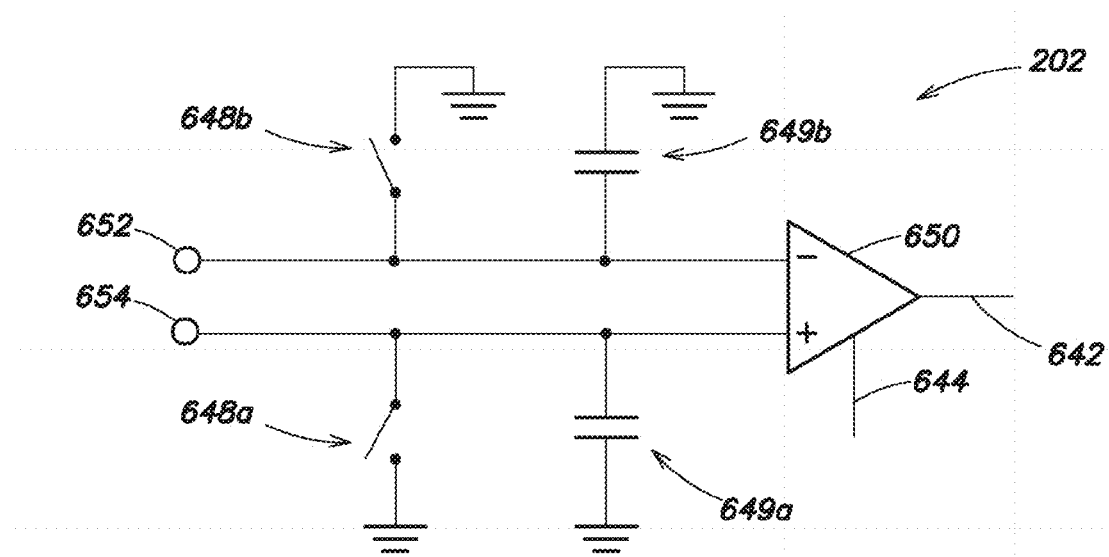

Differential amplifier 202 may be any differential amplifier known to one of ordinary skill in the art or otherwise suitable for amplifying the difference between differential input signals, including but not limited to a differential amplifier with integrating capacitors coupled to both differential inputs. Some embodiments of differential amplifier 202 may include one or more control inputs 203 for controlling the operation of differential amplifier 202. Aspects of differential amplifier 202 which may be controlled by control input 203 may include, for example, the differential amplifier's bandwidth or gain. In some embodiments, differential amplifier 202 may be clocked (e.g., the amplifier's operation may be synchronized by a clock signal). Some embodiments of differential amplifier 202 are shown in FIGS. 6A-6C and discussed in detail below.

As described above, embodiments of the optical receiver 100 illustrated in FIG. 1A may be configured to convert optical signals encoding data (e.g., optical signals propagating through an optical waveguide coupled to photodetector 103) into electrical signals encoding the same data. By differentially amplifying the signal provided by photodetector 103 (which includes a noise component, such as a dark current noise component) and the signal provided by noise measurement unit 104 (which matches the noise component of photodetector 103), the optical receiver 100 of FIG. 1A may produce an electrical signal that encodes the same data as the optical signals and has a high signal to noise ratio (e.g., SNR of at least 5:1, at least 10:1, or at least 20:1).

Embodiments of the optical receiver 100 illustrated in FIG. 1A may operate at data rates as high as 4 Gb per second, with sensitivities lower than 10 µA.

Components of optical receiver 100 illustrated in FIG. 1A may be fabricated and coupled using techniques known to one of ordinary skill in the art or otherwise suitable for manufacturing an optical receiver, including but not limited to integration on a semiconductor substrate (e.g., monolithic integration in a standard CMOS process, monolithic integration in another fabrication process, or heterogeneous integration). In some embodiments, portions of photodetector 103, portions of noise measurement unit 104 (e.g., a photodetector portion), and/or portions of transistors of differential receiver 202 may be fabricated in a same layer of an integrated circuit as a silicon waveguide coupled to photodetector 103. For example, a PN junction of a PN-junction photodiode, a PIN region of a PIN photodiode, doped regions of transistors, and/or portions of a silicon waveguide may be fabricated in a body-silicon layer of the integrated circuit at a front-end of a fabrication process, such as a CMOS fabrication process. As another example, a cathode or anode of a photodetector, a gate of a transistor, and portions of a silicon waveguide may be fabricated in a gate-polysilicon layer of the integrated circuit at a front-end of a fabrication process.

Figure 1B:
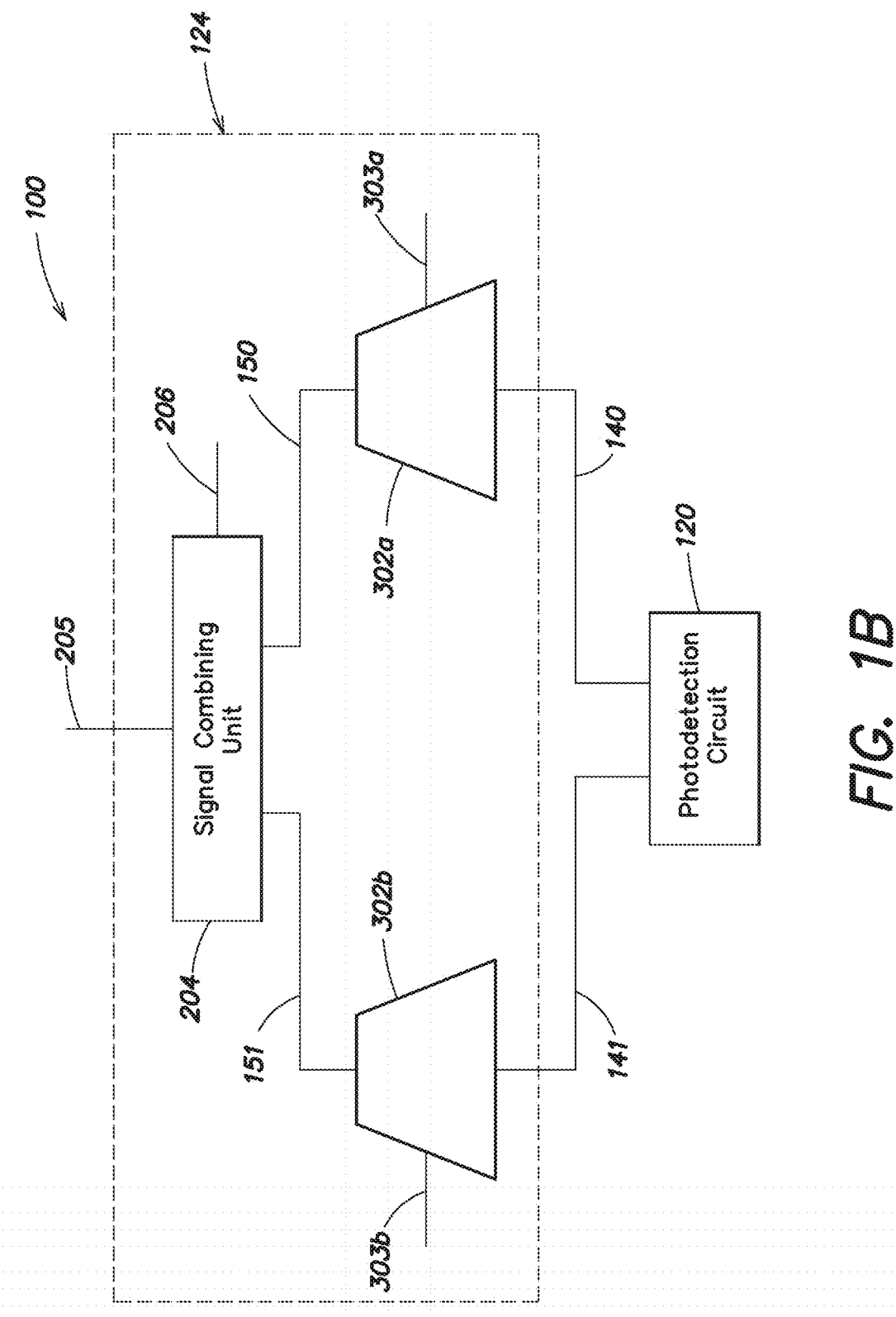
FIG. 1B shows a block diagram of an optical receiver 100, according to some additional embodiments.

FIG. 1B shows a block diagram of an optical receiver 100, according to some additional embodiments. Embodiments of optical receiver 100 of FIG. 1B may convert optical signals encoding data into electrical signals encoding the same data. In the example of FIG. 1B, optical receiver 100 includes an amplification circuit 124 (e.g., two amplifiers 302a and 302b, and a signal combining unit 204), and a photodetection circuit 120. In some embodiments, photodetection circuit 120 converts an optical signal into an electrical signal, and provides that electrical signal to amplifiers 302a and 303a via amplifier input terminals 140 and 141, respectively. In some embodiments, photodetection circuit 120 converts an optical signal into first and second electrical signals, provides the first electrical signal to amplifier 302a via amplifier input terminal 140, and provides the second electrical signal to amplifier 303a via amplifier input terminal 141. In some embodiments, photodetection circuit 120 converts a first optical signal into a first electrical signal and a second optical signal into a second electrical signal, provides the first electrical signal to amplifier 302a via amplifier input 140, and provides the second electrical signal to amplifier 303a via amplifier input 141. In some embodiments, outputs of photodetection unit 120 may be coupled (e.g., directly connected or indirectly connected) to input terminals 140 and 141 of amplifiers 302a and 303a, respectively. Amplifier 302a amplifies the signal it receives from photodetection circuit 120 and provides the amplified signal at output terminal 150. Amplifier 302b amplifies the signal it receives from photodetection circuit 120 and provides the amplified signal at output terminal 151. The amplified signals are provided as inputs to a signal combining unit 204, which forms some combination of the amplified signals and provides the combined signal as an output at terminal 205. The data from the optical signal(s) is encoded in the combined electrical signal.

Embodiments of photodetection circuit 120 may include one or more devices known to one of ordinary skill in the art or otherwise suitable for converting optical signals into electrical signals, including but not limited to photodiodes, photogates, phototransistors, or photoresistors. In preferred embodiments, photodetection circuit 120 may include one or more PN-junction photodiodes and/or one or more PIN photodiodes. Some embodiments of a photodetector portion of photodetection circuit 120 are shown in FIGS. 4A-5B and discussed in detail below. In some embodiments, photodetection circuit 120 may be coupled to an optical waveguide, and may convert optical signals propagating through the optical waveguide into electrical signals (e.g., voltages or currents). The electrical signals produced by photodetection circuit 120 may be indicative of data encoded in the optical signals.

In some embodiments, photodetection circuit 120 may include two or more photodetectors. The intrinsic capacitances of the photodetectors may be matched (e.g., the deviation of the capacitance seen at an output terminal of one of the photodetectors from the capacitance seen at an output terminal of another of the photodetectors may be between 0% and 20%, between 0% and 10%, between 0% and 5%, or preferably between 0% and 2%). Matching the capacitances of the photodetectors may enhance the performance of amplification circuit 124.

Amplifier 302a may be any amplifier known to one of ordinary skill in the art or otherwise suitable for amplifying an input signal, including but not limited to a differential amplifier. Some embodiments of amplifier 302a may include one or more control inputs 303a for controlling the amplifier's operation. Aspects of amplifier 302a which may be controlled by control input 303a may include, for example, the amplifier's bandwidth or gain. In some embodiments, amplifier 302a may be clocked (e.g., the amplifier's operation may be synchronized by a clock signal). In some embodiments, amplifier 302b may be the same type of amplifier as amplifier 302a. In some embodiments, amplifiers 302a and 302b may differ. Some embodiments of amplifiers 302a and 302b are shown in FIGS. 6A-6C and discussed in detail below.

Signal combining unit 204 may be any circuit or semiconductor structure known to one of ordinary skill in the art or otherwise suitable for combining two or more input signals (or portions thereof) into an output signal. In some embodiments, signal combining unit 204 may have data input terminals coupled to the outputs of receivers 302a and 302b. In some embodiments, signal combining unit 204 may have a selection terminal 206 configured to receive a selection signal that controls the manner in which the data signals received on the data input terminals are combined in the output signal provided at output terminal 205. As just one example, signal combining unit 204 may be a multiplexer, and selection terminal 206 may be the multiplexer's selection input.

In some embodiments, the components of the optical receiver 100 illustrated in FIG. 1B may be operated in a double data rate (DDR) mode (e.g., configured such that the data rate of the receiver (100) is double the data rate of either of the amplifiers (302a, 302b)). In some embodiments of a DDR configuration, photodetection circuit 120 may provide, to amplifiers 302a and 302b, electrical signals encoding the same data (e.g., electrical signals obtained by photodetection of a same optical signal). Also, amplifiers 302a and 302b may be clocked circuits synchronized to opposite half-periods of a clock signal CLK (e.g., amplifier 302a may be synchronized to rising edges of CLK, and amplifier 302b may be synchronized to falling edges of CLK or to rising edges of a signal CLK' that is an inverse of signal CLK or out of phase with signal CLK), and CLK may be supplied as the selection signal to signal combining unit 204. In such embodiments, during a first half-period of CLK, amplifier 302a amplifies its input signal and provides the amplified signal to signal combining unit 204, which outputs the signal provided by amplifier 204 via output terminal 205. During this same half-period, amplifier 302b may perform recovery operations (e.g., resetting the amplifier for the next amplification operation by charging and discharging various nodes of the amplifier circuit to suitable potentials). During a second half-period of CLK, amplifier 302b amplifies its input signal and provides the amplified signal to signal combining unit 204, which outputs the signal provided by amplifier 204 via output terminal 205. During this same half-period, amplifier 302a may perform recover operations.

In summary, some embodiments of optical receiver 100 of FIG. 1B double the data rate of a clocked amplifier by replicating the amplifier and resetting the replica while the other amplifier amplifies the electrical signal provided by the photodetection circuit. Further increases in the data rate may be obtained by further increasing the number of amplifiers, using techniques known to one of ordinary skill in the art. In some embodiments, the optical receiver's data rate may increase linearly with the number of amplifiers. For example, embodiments of optical receiver 100 of FIG. 1B may include N amplifiers 302. Photodetection circuit 120 may provide the amplifiers 302 with electrical signals encoding the same data (e.g., data encoded in an optical signal received by the photodetection circuit). The amplifiers may be controlled by N clock signals (e.g., a first clock signal, a second clock signal 360/N degrees out of phase with respect to the first clock signal, a third clock signal 360/N degrees out of phase with respect to the second clock signal, and so on). The N clock signals may also be provided as selection inputs to signal combining unit 204, which may multiplex the signals provided by the N amplifiers onto output terminal 205. In some embodiments, configuring 4 amplifiers or 8 amplifiers in this manner may increase the data rate by 4× or 8×, respectively.

Another technique for increasing the data rate of an optical receiver 100 involves increasing the clock rate of an amplifier 302. The data rate of optical receiver 100 may increase linearly with the increase in the clock rate of amplifier 302. However, increasing the clock rate of amplifier 302 may necessitate large (e.g., exponential) increases in the power consumed by the optical data communication system's light source to avoid adversely affecting the optical receiver's performance. The sensitivity of an amplifier 302 may be fundamentally limited by the amplifier's recovery time (e.g., the time during which nodes of the amplifier circuit are pre-charged to pre-determined levels prior to detecting and amplifying an input signal). As the amplifier's clock rate increases, the time available for recovery between amplification operations decreases. When the amplifier's recovery time is insufficient to complete the pre-charging operations, the amplifier's sensitivity decreases. In some embodiments, the amplifier's sensitivity decreases exponentially with the recovery time. As described above, exponentially increasing the light source's power may compensate for the amplifier's decreased sensitivity.

Thus, with a linear increase in the clock rate of amplifier 302 and an exponential increase in the power of the light source, a linear increase in the data rate of optical receiver 100 may be obtained without adversely affecting the receiver's sensitivity. By contrast, with the DDR technique described above and a linear increase in the power of the light source, a linear increase in the data rate of optical receiver 100 may be obtained without adversely affecting the receiver's sensitivity. The linear increase in the light source's power may offset the 3 dB transmission loss that occurs whenever the photodetection circuit 120 splits the optical signal provided at its input or the electrical signal provided at its output, in order to provide each of the optical receiver's amplifiers 302 with the same electrical signal.

In some embodiments, the components of the optical receiver 100 illustrated in FIG. 1B may be operated in a decision feedback equalization (DFE) mode. DFE may, for example, be used to compensate for hysteresis in photodetection circuit 120. Ideally, photodetection circuit 120 provides an electrical signal with a first signal level whenever the optical signal received by the photodetection circuit encodes a 0-bit, and provides an electrical signal with a second signal level whenever the optical signal received by the photodetection circuit encodes a 1-bit. However, some embodiments of photodetection circuit may exhibit effects of hysteresis. In some embodiments, the signal levels provided by a photodetector when the optical signal encodes a 0-bit (or a 1-bit) may depend on the value of the previous bit sensed by the photodetector. For example, when the previous bit sensed by the photodetector was a 0-bit, the photodetector may convert the current bit to a first signal level L when the current bit is a 0-bit, or to a second signal level H when the current bit is a 1-bit. However, when the previous bit sensed by the photodetector was a 1-bit, the photodetector may convert the current bit to a third signal level L+α when the current bit is a 0-bit, or to a fourth signal level H+α when the current bit is a 1-bit. If the difference between the second signal level (L+α) and the third signal level (H) is small, it may be difficult for a receiver 302 to reliably distinguish a 0-bit signal level from a 1-bit signal level.

In some embodiments, the components of the optical receiver 100 illustrated in FIG. 1B may be configured to compensate for the hysteresis of the photodetection circuit 120 using decision feedback equalization (DFE), thereby improving the sensitivity of the optical receiver. In some embodiments of a DFE configuration, photodetection circuit 120 may provide, to amplifiers 302a and 302b, electrical signals encoding the same data (e.g., electrical signals obtained by photodetection of a same optical signal). Also, amplifiers 302a and 302b may be clocked circuits synchronized to a same clock signal CLK, and the signal combining unit's output terminal 205 may be coupled to selection terminal 206. In such embodiments, signal combining unit 204 selects the signal provided by one amplifier (e.g., 302a) when the optical receiver's output signal indicates that the previous bit was a 0-bit, and selects the signal provided by the other amplifier (e.g., 302b) when the optical receiver's output signal indicates that the previous bit was a 1-bit. In some embodiments, amplifiers 302a and 302b may use different threshold values to distinguish between an electrical signal representing a 0-bit and an electrical signal representing a 1-bit. For example, amplifier 302a, which may be selected when the previous bit was a 0-bit, may use a threshold value of (L+H)/2 to distinguish a signal level representing a 0-bit (e.g., level L) from a signal level representing a 1-bit (e.g., level H). Amplifier 302b, which may be selected when the previous bit was a 1-bit, may use a threshold value of ((L+α)+(H+α))/2 to distinguish a signal level representing a 0-bit (e.g., level L+α) from a signal level representing a 1-bit (e.g., level H+α).

In some embodiments, the threshold value of an amplifier may be adjustable. In some embodiments, the threshold value may be adjusted to a value between the above-described light and dark signal values, or to any other suitable value. In some embodiments, the threshold value may be adjusted to provide offset calibration.

As described above, embodiments of the optical receiver 100 illustrated in FIG. 1B may convert optical signals encoding data (e.g., optical signals propagating through one or more optical waveguides coupled to photodetection circuit 120) into electrical signals encoding the same data. Embodiments of the optical receiver 100 illustrated in FIG. 1B may operate at data rates as high as 3.5 Gb per second, with sensitivities lower than 10 μA.

In some embodiments, the optical receiver 100 illustrated in FIG. 1B may operate in a double data rate (DDR) mode or in a decision feedback equalization (DFE) mode. The optical receiver's operating mode may be fixed (e.g., during fabrication) or programmable. Programmability of the optical receiver's operating mode may be implemented using techniques known to one of ordinary skill in the art or otherwise suitable for controlling the operation of the optical receiver's components, including but not limited to switchable coupling of the signal combining unit's selection input 206 to a clock signal CLK or to the optical receiver's output terminal 205, switchable coupling of the clock terminals of amplifiers 302a and 302b to various clock signals, and/or adjustment, via control terminal 303, of either amplifier's threshold signal level for distinguishing an electrical signal representing a 0-bit from an electrical signal representing a 1-bit.

Components of optical receiver 100 illustrated in FIG. 1B may be fabricated and coupled using techniques known to one of ordinary skill in the art or otherwise suitable for manufacturing an optical receiver, including but not limited to integration on a semiconductor substrate (e.g., monolithic integration in a standard CMOS process, monolithic integration in another fabrication process, or heterogeneous integration). In some embodiments, portions of photodetection circuit 120 (e.g., photodetector portions) and/or portions of transistors of receivers 302a and 302b may be fabricated in a same layer of an integrated circuit as a silicon waveguide coupled to photodetection circuit 120. For example, a PN junction of a PN-junction photodiode, a PIN region of a PIN photodiode, doped regions of transistors, and/or portions of a silicon waveguide may be fabricated in a body-silicon layer of the integrated circuit at a front-end of a fabrication process, such as a CMOS fabrication process. As another example, a cathode or anode of a photodetector, a gate of a transistor, and portions of a silicon waveguide may be fabricated in a gate-polysilicon layer of the integrated circuit at a front-end of a fabrication process.

Features of the optical receivers 100 illustrated in FIGS. 1A and 1B may be combined in numerous ways. FIGS.

2A-2G show schematics of optical receivers 100 which include features of the optical receiver illustrated in FIG. 1A and/or the optical receiver illustrated in FIG. 1B, according to some embodiments. In some embodiments, the optical receivers 100 illustrated in FIGS. 2A-2G may also include additional features not illustrated in the optical receivers 100 of FIG. 1A or FIG. 1B.

Figure 2A:
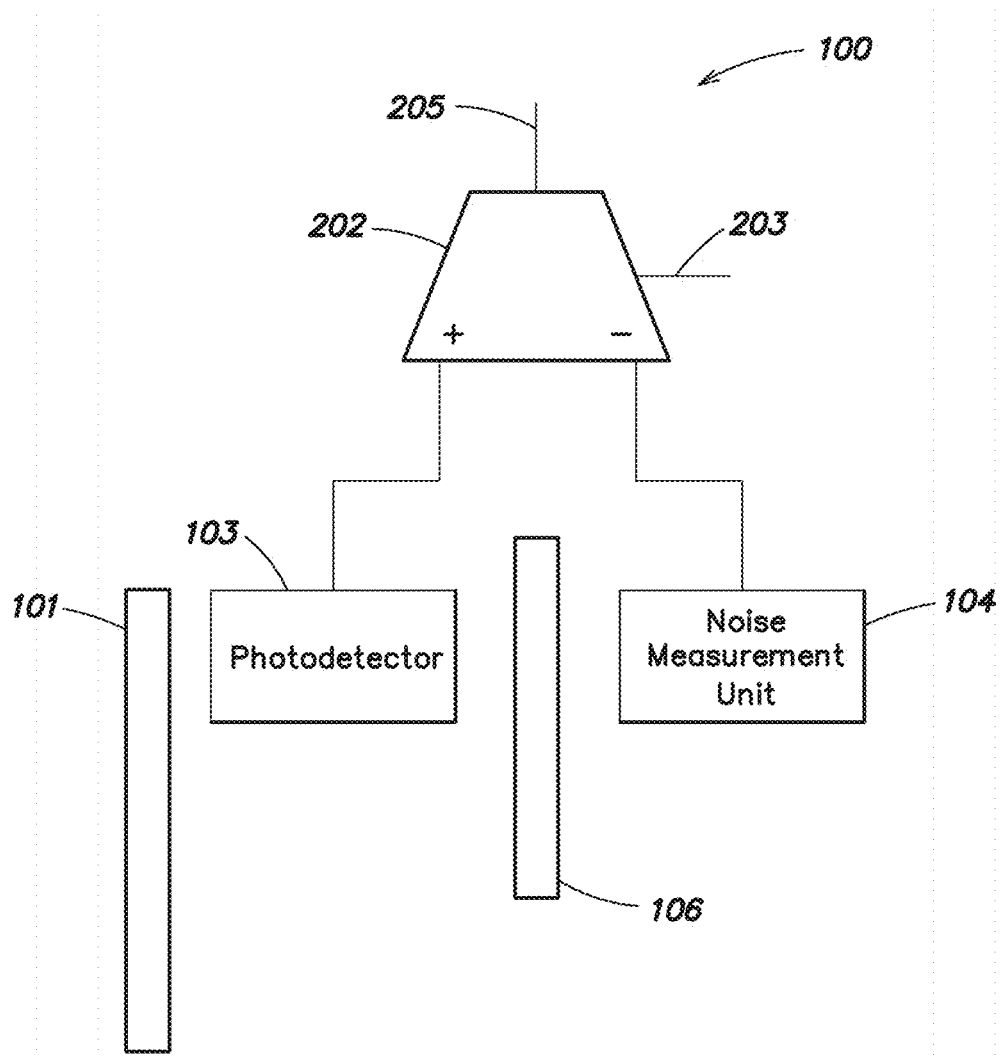

FIG. 2A shows a schematic of an optical receiver 100, according to some embodiments. The optical receiver of FIG. 2A includes a differential amplifier 202, a photodetector 103, and a noise measurement unit 104, which are arranged as in FIG. 1A. In addition, the optical receiver of FIG. 2A includes an optical isolation unit 106. In some embodiments, noise measurement unit 104 may be fully or partially optically isolated from photodetector 103 by optical isolation unit 106. In some embodiments, optical isolation unit 106 may prevent or reduce cross-talk between photodetector 103 and noise measurement unit 104. In some embodiments, optical isolation unit 106 may be a structure interposed between noise measurement unit 104 and photodetector 103. In some embodiments, optical isolation unit 106 may be, for example, a metallic structure, such as a metallic layer deposited on an integrated circuit substrate. In some embodiments, optical isolation unit 106 may include metallic materials such as copper, tungsten, titanium, aluminum, tantalum, tantalum nitride or any other material that is optically absorptive (e.g., highly optically absorptive) and compatible with a CMOS process.

FIG. 2A also illustrates an optical waveguide 101 to which photodetector 103 is coupled. In some embodiments, optical receiver 100 may include at least a portion of an optical waveguide 101 to which photodetector 103 is coupled.

Figure 2B:
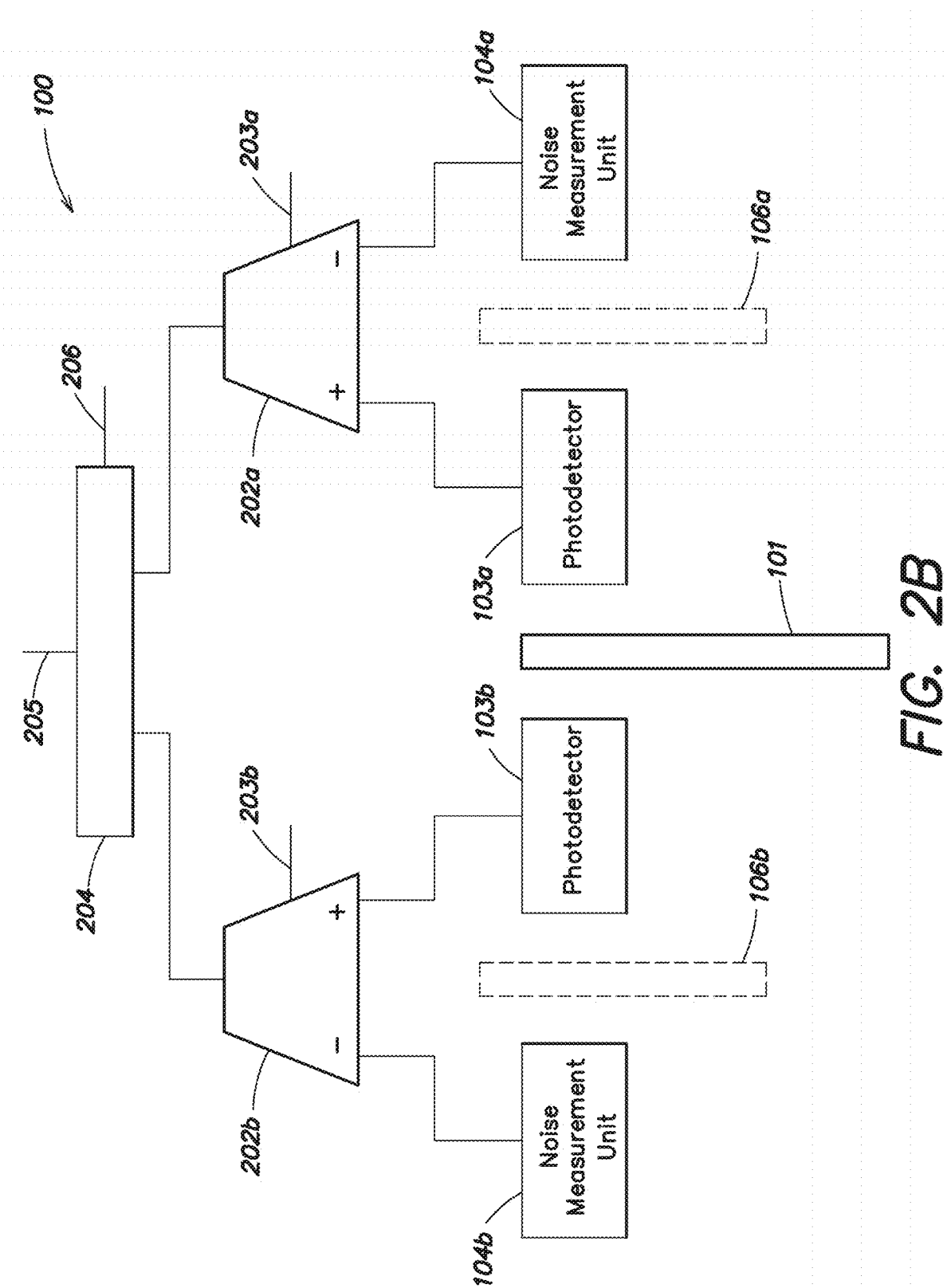

FIG. 2B shows a schematic of an optical receiver 100, according to some additional embodiments. The optical receiver of FIG. 2B includes two photodetectors (103a, 103b), two noise measurement units (104a, 104b), two differential amplifiers (202a, 202b), and a signal combining unit 204. Photodetectors 103a and 103b are coupled to an optical waveguide 101. Outputs of photodetector 103a and noise measurement unit 104a are coupled to differential inputs of amplifier 202a. Outputs of photodetector 103b and noise measurement unit 104b are coupled to differential inputs of amplifier 202b. Outputs of differential amplifiers 202a and 202b are coupled to data inputs of signal combining unit 204. In some embodiments, an optical isolation unit 106a may be interposed between photodetector 103a and noise measurement unit 104a. In some embodiments, an optical isolation unit 106b may be interposed between photodetector 103b and noise measurement unit 104b.

In some embodiments, the optical receiver of FIG. 2B may be configured to operate in a double-data rate (DDR) mode or in a decision feedback equalization (DFE) mode, as described above with respect to FIG. 1B. In such embodiments, differential amplifiers 202a and 202b may be clocked. When the optical receiver 100 of FIG. 2B operates in DDR mode, differential amplifiers 202a and 202b may be synchronized to opposite half-periods of a clock signal CLK, and selection input 206 of signal combining unit 204 may be coupled to receiver clock signal CLK. When the optical receiver 100 of FIG. 2B operates in DFE mode, differential amplifiers 202a and 202b may be synchronized to a same clock signal CLK, and the signal combining unit's selection terminal 206 may be coupled to its output terminal 205. Accordingly, optical receiver 100 of FIG. 2B may be configured to perform noise compensation (e.g., dark current noise compensation) as described above with respect to FIG. 1A, and to operate in a DDR mode or a DFE mode as described above with respect to FIG. 1B.

Figure 2C:
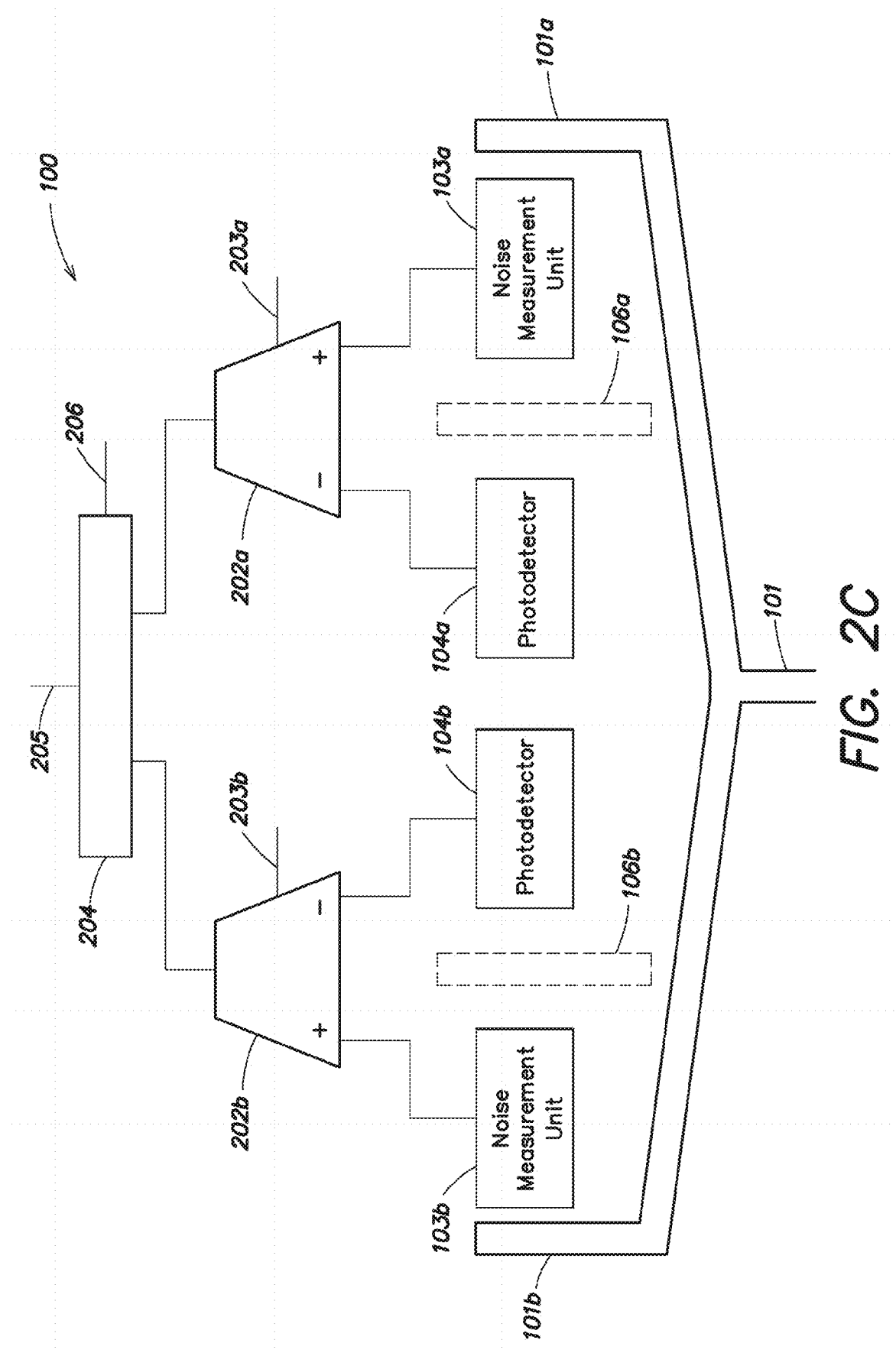

FIG. 2C shows a schematic of an optical receiver 100, according to some additional embodiments. The optical receiver of FIG. 2C includes two photodetectors (103a, 103b), two noise measurement units (104a, 104b), two differential amplifiers (202a, 202b), and a signal combining unit 204. Photodetectors 103a and 103b are coupled to branches 101a and 101b, respectively, of an optical waveguide 101. The optical signal carried by optical waveguide 101 may be split at the junction between branches 101a and 101b, such that the branches receive optical signals of approximately the same intensity. Outputs of photodetector 103a and noise measurement unit 104a are coupled to differential inputs of amplifier 202a. Outputs of photodetector 103b and noise measurement unit 104b are coupled to differential inputs of amplifier 202b. Outputs of differential amplifiers 202a and 202b are coupled to data inputs of signal combining unit 204. In some embodiments, an optical isolation unit 106a may be interposed between photodetector 103a and noise measurement unit 104a. In some embodiments, an optical isolation unit 106b may be interposed between photodetector 103b and noise measurement unit 104b. Like the optical receiver of FIG. 2B, the optical receiver of FIG. 2C may be configured to perform noise compensation and to operate in a DDR mode or a DFE mode.

In contrast to FIG. 2B, which illustrates two photodetectors (103a, 103b) coupled to a same branch of an optical waveguide 101, FIG. 2C illustrates two photodetectors (103a and 103b) coupled to different branches (101a and 101b, respectively) of an optical waveguide 101. When multiple photodetectors are coupled to a same branch of an optical waveguide, as in FIG. 2B, a photodetector positioned at a greater optical distance from the light source may receive optical signals of lower intensity than a photodetector positioned at a less optical distance from the light source, depending on how the photodetectors are configured. As the intensity of the optical signal received by the photodetector decreases, the difficulty of reliably distinguishing an optical 0-bit from an optical 1-bit may increase. In some embodiments, splitting optical waveguide 101 into branches and coupling a photodetector to each branch, as in FIG. 2C, may result in the photodetectors receiving optical signals of roughly the same intensity.

Figure 2D:
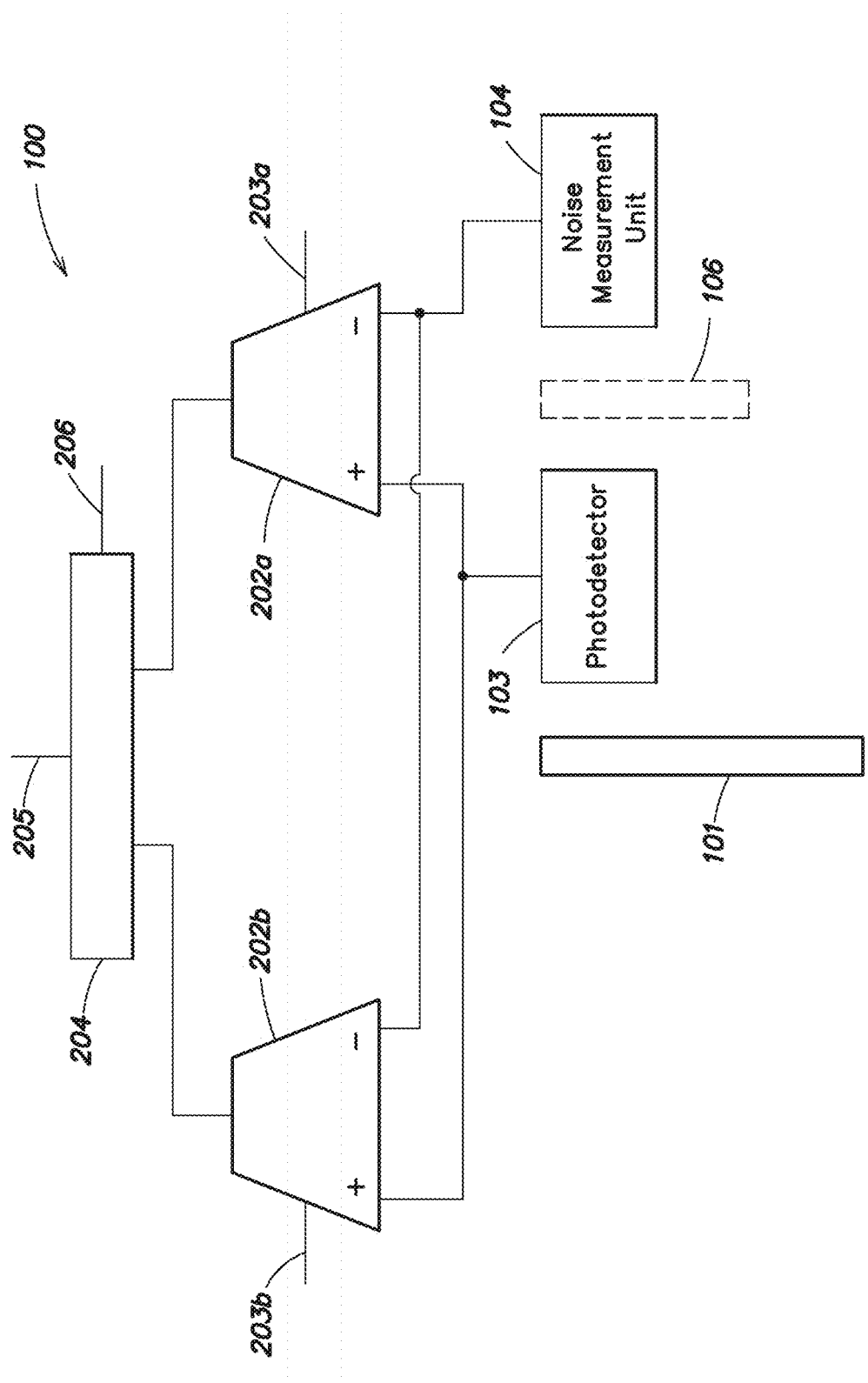

FIG. 2D shows a schematic of an optical receiver 100, according to some additional embodiments. The optical receiver of FIG. 2D includes one photodetector (103), one noise measurement unit (104), two differential amplifiers (202a, 202b), and a signal combining unit 204. Photodetector 103 is coupled to an optical waveguide 101. Outputs of photodetector 103 and noise measurement unit 104 are coupled to differential inputs of amplifier 202a and amplifier 202b. In some embodiments, an optical isolation unit 106 may be interposed between photodetector 103 and noise measurement unit 104. Outputs of amplifiers 202a and 202b are coupled to the data selection inputs of signal combining unit 204. Like the optical receivers of FIGS. 2B and 2C, the optical receiver of FIG. 2D may be configured to perform noise compensation and to operate in a DDR mode or a DFE mode. In contrast to FIGS. 2B and 2C, which illustrate two differential amplifiers coupled to distinct photodetectors, FIG. 2D illustrates two differential amplifiers coupled to a same photodetector.

Figure 2E:
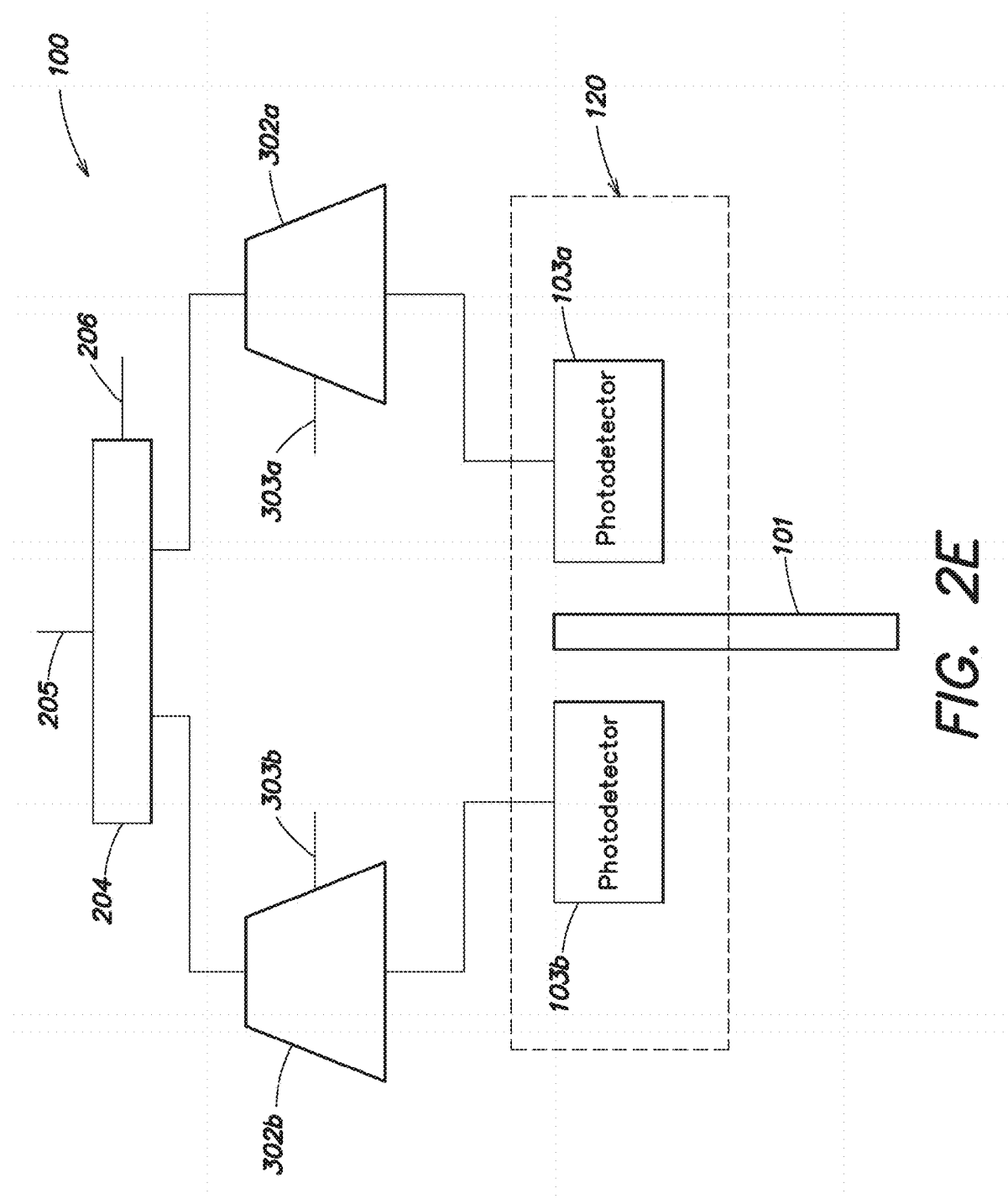

FIG. 2E shows a schematic of an optical receiver 100, according to some additional embodiments. The optical receiver 100 of FIG. 2E includes a photodetection circuit 120, two receivers 302a and 302b, and a signal combining unit 204, which are configured in like manner as the corresponding components of FIG. 1B. In the embodiment of FIG. 2E, photodetection circuit 120 includes two photodetectors 103a and 103b which are coupled to an optical waveguide 101. The outputs of photodetectors 103a and 103b are coupled to the inputs of amplifiers 302a and 302b, respectively.

FIG. 2F shows a schematic of an optical receiver 100, according to some additional embodiments. The optical receiver 100 of FIG. 2F includes a photodetection circuit 120, two receivers 302a and 302b, and a signal combining unit 204, which are configured in like manner as the corresponding components of FIG. 1B. In the embodiment of FIG. 2F, photodetection circuit 120 includes two photodetectors 103a and 103b which are coupled to branches 101a and 101b, respectively, of an optical waveguide 101. The optical signal carried by optical waveguide 101 may be split at the junction between branches 101a and 101b, such that the branches receive optical signals of approximately the same intensity. The outputs of photodetectors 103a and 103b are coupled to the inputs of amplifiers 302a and 302b, respectively.

FIG. 2G shows a schematic of an optical receiver 100, according to some additional embodiments. The optical receiver 100 of FIG. 2G includes a photodetection circuit 120, two receivers 302a and 302b, and a signal combining unit 204, which are configured in like manner as the corresponding components of FIG. 1B. In the embodiment of FIG. 2E, photodetection circuit 120 includes a photodetector 103 which is coupled to an optical waveguide 101. The output of photodetector 103 is coupled to the inputs of amplifiers 302a and 302b.

Figure 3:
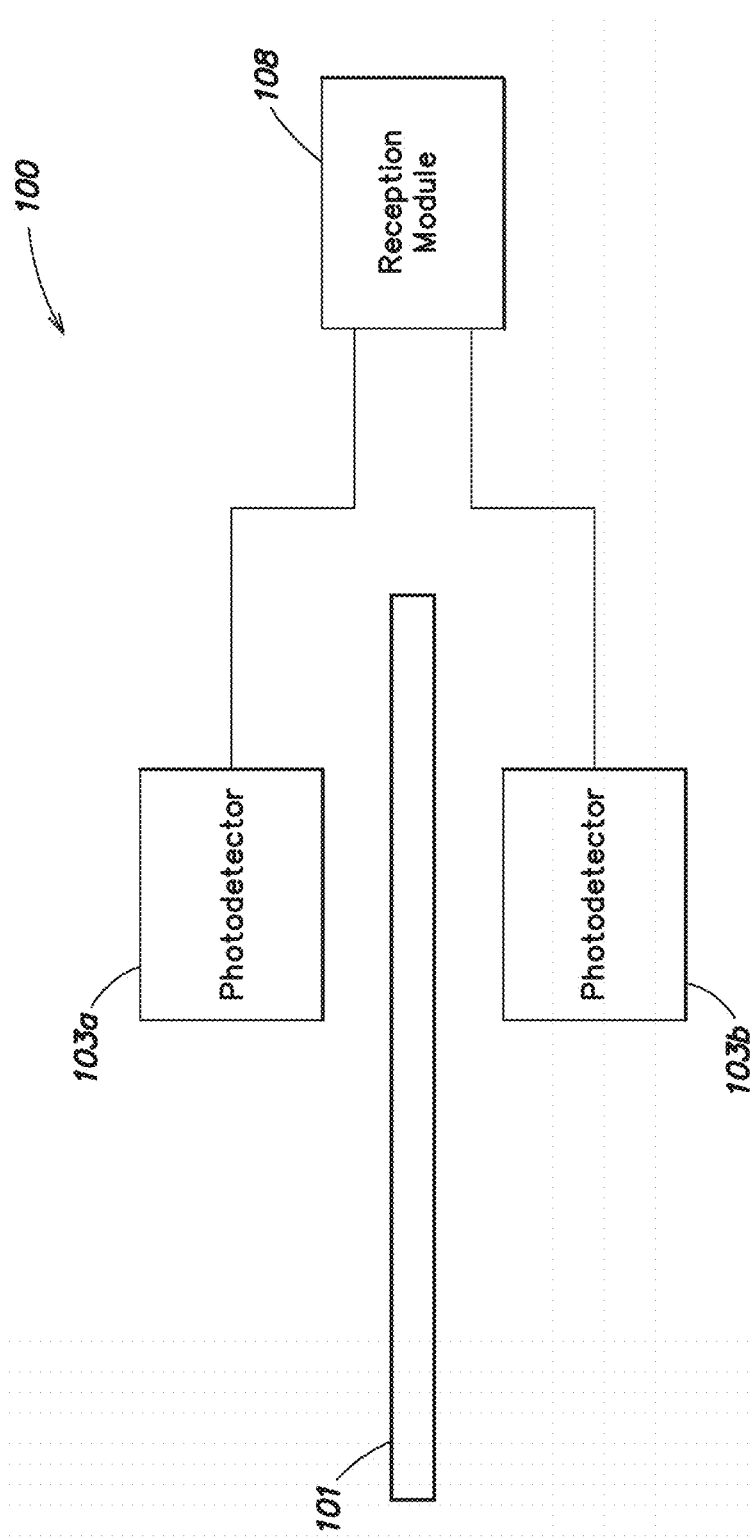
FIG. 3 shows a block diagram of an optical receiver 100, according to some additional embodiments.

FIG. 3 shows a block diagram of an optical receiver 100, according to some additional embodiments. Embodiments of optical receiver 100 of FIG. 3 may convert optical signals encoding data into electrical signals encoding the same data. In the example of FIG. 3, optical receiver 100 includes two photodetectors 103a and 103b and a reception circuit 108. Photodetector 103a is coupled to optical waveguide 101, which is configured to propagate optical signals encoded with data. In some embodiments, reception circuit 108 may be configured to output an electrical signal based on the signals received from photodetectors 103a and 103b. The output signal may encode some or all of the data encoded in the optical signals of optical waveguide 101.

In some embodiments, photodetector 103b may be configured as a 'dummy photodetector' (e.g., a photodetector that is coupled to an optical data communication system but optically isolated from the system's optical data signals). For example, photodetector 103b may be optically isolated from optical waveguide 101 by an optical isolation unit. In such embodiments, the signals provided by photodetector 103b may be indicative of the noise components of signals provided by other photodetectors, such as photodetector 103a, that are coupled to receive optical data signals. Embodiments of reception circuit 108 may use the signals provided by a dummy photodetector to filter, reduce, or otherwise compensate for a noise component of a signal provided by photodetector 103a. In some embodiments, reception circuit 108 may include a differential amplifier configured to amplify a difference between the signal received from photodetector 103a and the signal received from photodetector 103b. Embodiments of differential amplifiers are described in detail above.

In some embodiments, photodetectors 103a and 103b may be coupled to receive the same optical signals. For example, photodetector 103b may be coupled to optical waveguide 101, or photodetectors 103a and 103b may be coupled to distinct optical waveguides carrying the same optical signals. In such embodiments, reception circuit 108 may use the signals provided by photodetectors 103a and 103b to perform differential feedback equalization, as described above, which may increase the sensitivity of optical receiver 100. Alternatively, reception circuit 108 may use the signals provided by the two photodetectors to perform double data rate signal conversion, as described above.

Figure 4A:
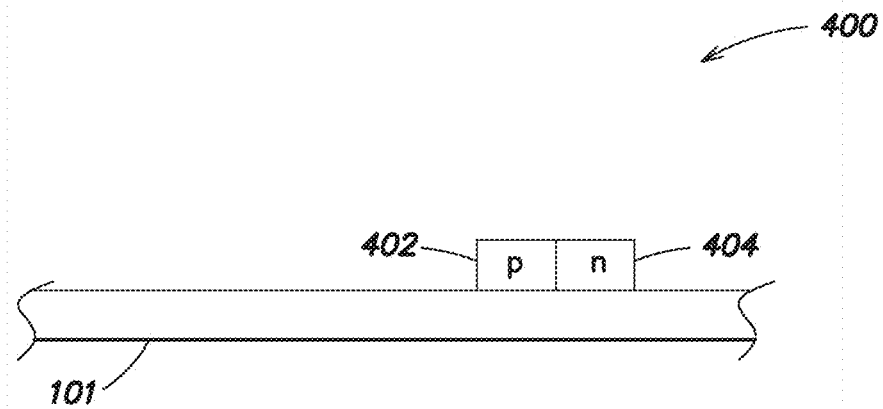
FIGS. 4A-4D shows schematics of PN-junction diodes, according to some embodiments.

FIG. 4A shows a schematic of a PN-junction photodiode 400, according to some embodiments. In the example of FIG. 4, photodiode 400 is coupled to an optical waveguide 101. Photodiode 400 is formed by a PN-junction (e.g., a p-doped or p-type region 402 of a semiconductor substrate adjacent to an n-doped or n-type region 404 of a semiconductor substrate). When the PN-junction is properly biased (e.g., reverse-biased), photons that strike the PN-junction may be absorbed and converted into free charge carriers, thereby causing current to flow from into the cathode (n-type region) and out of the anode (p-type region).

Figure 4B:
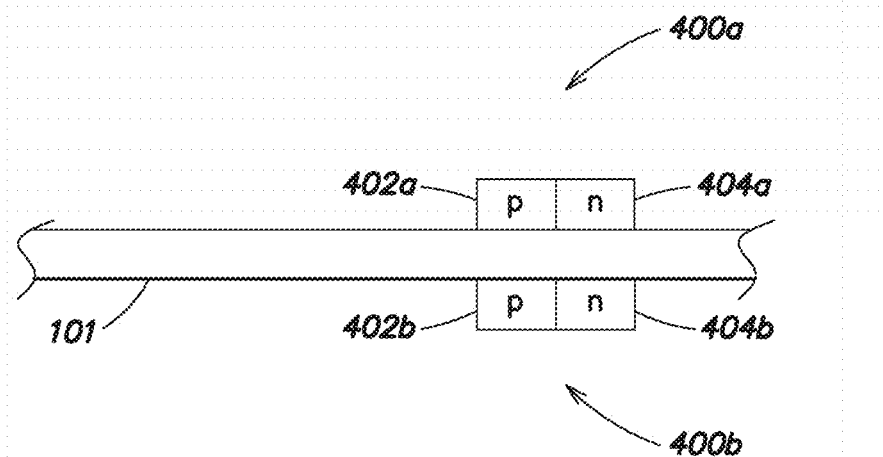

FIG. 4B shows a schematic of two PN-junction photodiodes 400a and 400b, according to some embodiments. In the example of FIG. 4B, photodiodes 400a and 400b are coupled to optical waveguide 101 on opposite sides of the waveguide and at approximately a same position longitudinal position along the optical waveguide. In the example of FIG. 4B, each of the photodiodes may generate substantially the same electrical signal in response to the optical signal propagating through waveguide 101, because the photodiodes are positioned to evenly absorb the optical signal's photons.

Figure 4C:
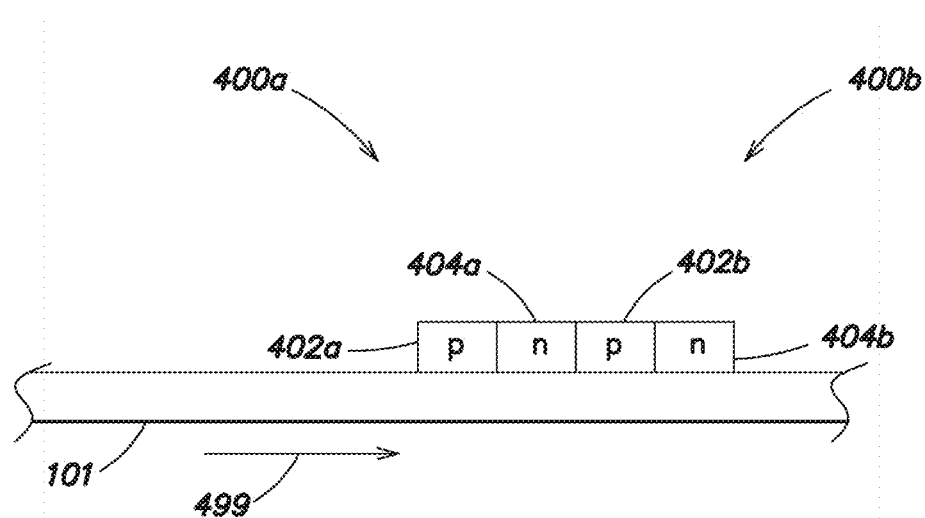

FIG. 4C shows a schematic of two PN-junction photodiodes 400a and 400b, according to some additional embodiments. In the example of FIG. 4C, photodiodes 400a and 400b are coupled to optical waveguide 101 on a same side of the waveguide and at adjacent longitudinal positions along the optical waveguide. In the example of FIG. 4C, photodiodes 400a and 400b may generate different electrical signals in response to the optical signal propagating through waveguide 101. For example, if the optical signal is moving in the direction illustrated by arrow 499, the signal reaches photodiode 400a before it reaches photodiode 400b. As the optical signal propagates past photodiode 400a, the photodiode absorbs photons, reducing the optical signal's intensity. Thus, when the lower-intensity optical signal reaches photodiode 400b, the current produced in photodiode 400b may be lower than the current produced in photodiode 400a.

Figure 4D:
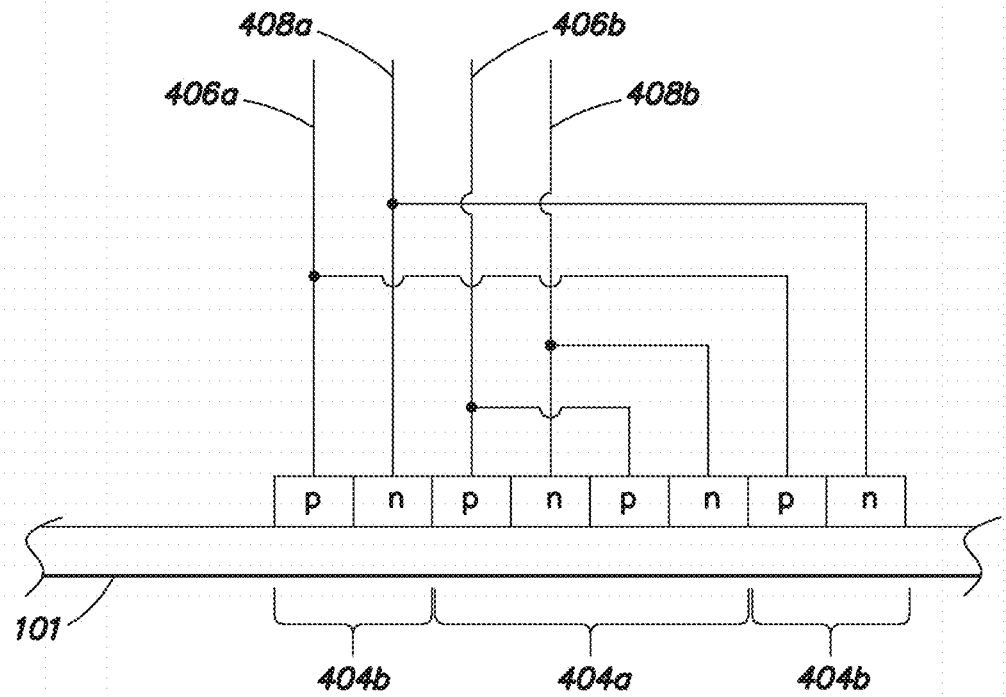

FIG. 4D shows a schematic of two interdigitated photodiodes 400a and 400b, according to some embodiments. In the example of FIG. 4D, p-type regions 402b and 402c are coupled together to form a p-type region of photodiode 400a, and n-type regions 404b and 404c are coupled together to form an n-type region of photodiode 400a. Likewise, p-type regions 402a and 402d are coupled together to form a p-type region of photodiode 400b, and n-type regions are coupled together to form an n-type region of photodiode 400b. When photodiodes 400a and 400b are configured in the manner illustrated in FIG. 4D, the two photodiodes may produce substantially the same electrical signals, because the average intensity of the optical signals that reach the PN-junctions of photodiode 400a may match the average intensity of the optical signals that reach the PN-junctions of photodiode 400b.

Figure 5A:
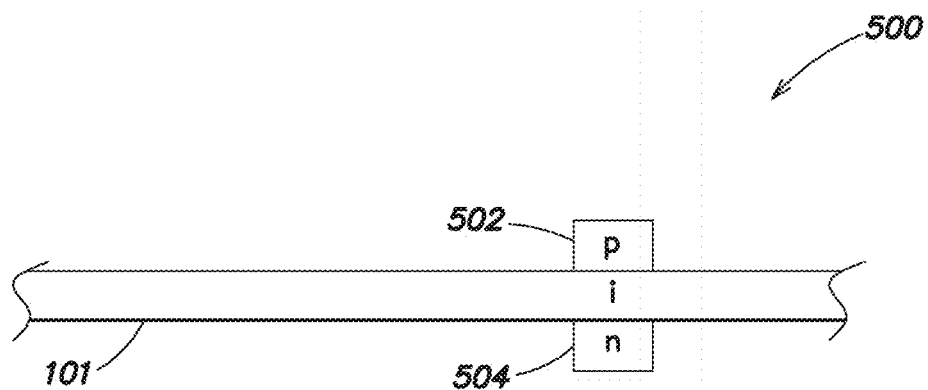
FIGS. 5A-5B show schematics of PIN diodes, according to some embodiments.

FIG. 5A shows a schematic of a PIN photodiode 500, according to some embodiments. Embodiments of PIN photodiode 500 include a p-doped or p-type region 502 of a semiconductor substrate, an n-doped or n-type region 504 of a semiconductor substrate, an intrinsic region sandwiched between the p-type and n-type regions. In the embodiment of FIG. 5A, the intrinsic region of PIN photodiode 500 is formed by a portion of optical waveguide 100. When PIN photodiode 500 is properly biased (e.g., reverse biased), photons that pass through the photodiode's intrinsic region may free charge carriers, thereby causing current to flow from into the cathode (n-type region) and out of the anode (p-type region).

Figure 5B:
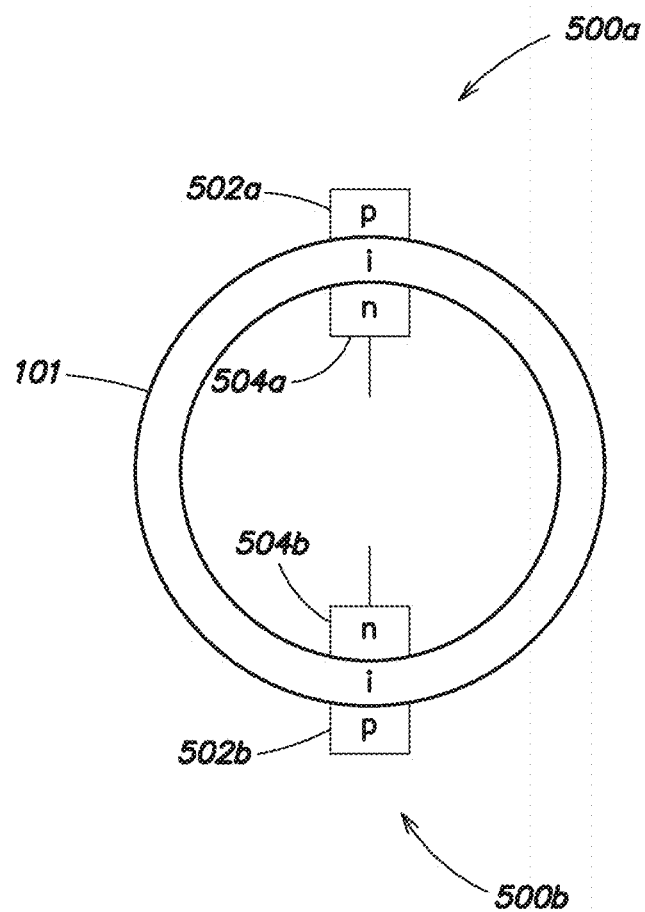

FIG. 5B shows a schematic of two PIN photodiodes 500a and 500b, according to some embodiments. In the example of FIG. 5B, the intrinsic regions of the two photodiodes are formed by portions of a ring-shaped optical waveguide. In some embodiments, optical signals propagating through the ring-shaped optical waveguide may pass by each photodiode multiple times, thereby increasing the photodiode current.

FIGS. 6A-6E show schematics of a differential amplifier 202, according to some embodiments. In each of FIGS. 6A-6D, differential amplifier 202 includes a differential amplification circuit 650 with an output terminal 642 and differential input terminals 652 and 654. In some embodiments, differential amplification circuit 650 may be clocked. In some embodiments, differential amplification circuit 650 may include an additional input terminal 644, which may be configured to receive control signals, clock signals, power supply signals, or any other signals known to one of ordinary skill in the art or otherwise suitable for controlling the operation of a differential amplifying circuit.

In the embodiment of FIG. 6A, differential amplifier 202 is configured as a resistive amplifier. In some embodiments, a resistance 646a may be coupled between input terminal 654 and a reference potential, such as ground. In some embodiments, a resistance 646b may be coupled between input terminal 652 and a reference potential, such as ground. In some embodiments, resistance 646a may be equal to resistance 646b, and the resistances 646a and 646b may be coupled to a same reference potential.

In the embodiment of FIG. 6B, differential amplifier 202 is configured as a transimpedance amplifier (TIA). In some embodiments, input terminal 654 may be coupled to differential amplification circuit 650 through a transimpedance circuit 647a. In some embodiments, input terminal 652 may be coupled to differential amplification circuit 650 through a transimpedance circuit 647b. In some embodiments, transimpedance circuits 647a and 647b may be configured in like manner.

In the embodiment of FIG. 6C, differential amplifier 202 is configured as a clocked, integrating amplifier. In some embodiments, input terminal 654 may be coupled to differential amplification circuit 650 through an integrator 660a. Integrator 660a may include a switch 648a coupled between input terminal 654 and a reference potential, such as ground. Integrator 660a may also include a capacitance 649a coupled between input terminal 654 and the reference potential. For example, capacitance 649a may be coupled in parallel with switch 648a. In some embodiments, input terminal 652 may be coupled to differential amplification circuit 650 through an integrator 660b. Integrator 660b may include a switch 648b coupled between input terminal 652 and a reference potential, such as ground. Integrator 660b may also include a capacitance 649b coupled between input terminal 654 and the reference potential. For example, capacitance 649b may be coupled in parallel with switch 648b. In some embodiments, capacitances 649a and 649b may be approximately equal (e.g., the ratio of capacitance 649b to capacitance 649a may be between 0.7 and 1.3, between 0.8 and 1.2, between 0.9 and 1.1, between 0.95 and 1.05, or between 0.99 and 1.01). In embodiments where input terminals 654 and 652 of differential amplifier 202 are coupled to a photodetector 103 and a noise measurement unit 104 (e.g., as illustrated in FIG. 1A), the effectiveness of the noise reduction (e.g., dark current noise reduction) performed by differential amplifier 202 may increase as the ratio of capacitance 649b to capacitance 649a approaches 1.0.

Figure 6D:
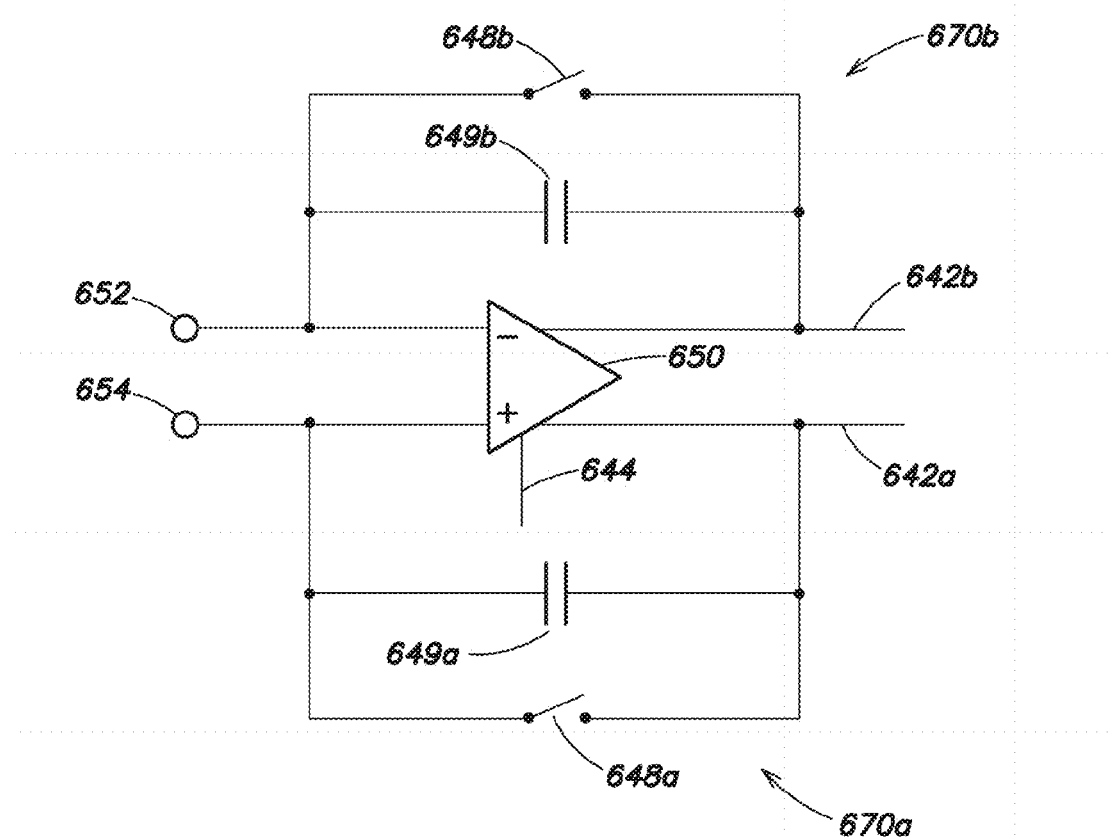

In the embodiment of FIG. 6D, differential amplifier 202 is configured as an integrating feedback amplifier with double-ended outputs 642a and 642b. In some embodiments, input terminal 654 may be coupled to differential amplification circuit 650 through an integrator 670a. Integrator 670a may include a switch 648a coupled between input terminal 654 and output terminal 642a. Integrator 670a may also include a capacitance 649a coupled between input terminal 654 and output terminal 642a. For example, capacitance 649a may be coupled in parallel with switch 648a. In some embodiments, input terminal 652 may be coupled to differential amplification circuit 650 through an integrator 660b. Integrator 660b may include a switch 648b coupled between input terminal 652 and output terminal 642b. Integrator 660b may also include a capacitance 649b coupled between input terminal 654 and output terminal 642b. For example, capacitance 649b may be coupled in parallel with switch 648b. In some embodiments, capacitances 649a and 649b may be approximately equal (e.g., the ratio of capacitance 649b to capacitance 649a may be between 0.7 and 1.3, between 0.8 and 1.2, between 0.9 and 1.1, between 0.95 and 1.05, or between 0.99 and 1.01). In embodiments where input terminals 654 and 652 of differential amplifier 202 are coupled to a photodetector 103 and a noise measurement unit 104, (e.g., as illustrated in FIG. 1A), the effectiveness of the noise reduction (e.g., dark current noise reduction) performed by differential amplifier 202 may increase as the ratio of capacitance 649b to capacitance 649a approaches 1.0.

Figure 6E:
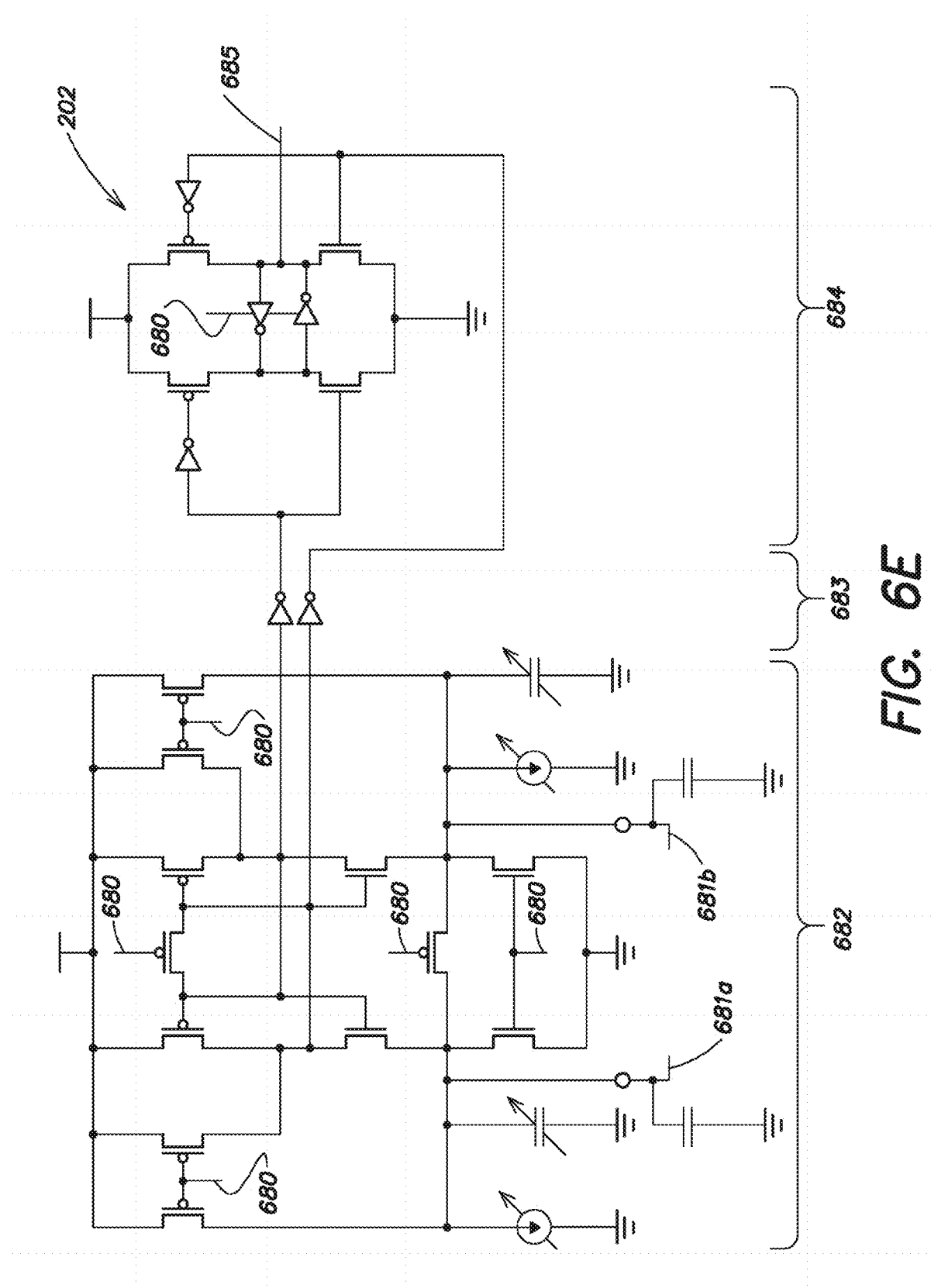

In the embodiment of FIG. 6E, differential amplifier 202 is configured as a clocked, integrating, sense amplifier with a regenerative latch. Amplifier 202 of FIG. 6E includes a latching sense amplifier (LSA) 682, a buffer stage 683, and a dynamic-to-static converter 683. Terminals 680 may be coupled to a clock signal, which may be forwarded in the optical signals received by optical receiver 100, recovered from the optical signals, generated by optical receiver 100, or supplied by some other source. In some embodiments, differential input terminals 681a and 681b of LSA 682 may be coupled, for example, to a photodetector 103 and a noise measurement unit 104, respectively. Embodiments of amplifier 202 of FIG. 6E may employ an integrate/evaluate/reset scheme to receive the differential signals at terminals 681, output a signal encoding a corresponding bit at terminal 685, and prepare for the next pair of differential signals.

In some embodiments, amplifier 202 may include internal offset-compensation digital-to-analog (DAC) circuitry to provide a suitable reference level for an illuminated photodetector coupled to an input terminal (e.g., terminal 681a) of the amplifier. In the example of FIG. 6E, the offset-compensation circuitry includes the variable current sources and capacitors. In some embodiments, the offset-compensation circuitry may include any active or passive circuit component known to one of ordinary skill in the art or otherwise suitable for performing offset compensation. In embodiments where one input terminal (e.g., terminal 681a) is coupled to a photodetector and the other input terminal (e.g., terminal 681b) is coupled to a noise measurement unit (e.g., a dummy photodetector), the capacitive matching provided by the noise measurement unit and/or the noise reduction made possible by the reference signal received from the noise measurement unit may reduce the dynamic range observed by the offset-compensation circuitry (e.g., the dynamic range may be limited, for example, to the extinction ratio range and the internal offset variation). In some embodiments, the offset-compensation circuitry may be programmable.

FIG. 7A shows a block diagram of an optical data communication system 700, according to some embodiments. System 700 includes a light source 602, an optical waveguide 604, an optical modulator 606, a modulator controller 608, and an optical receiver 100. In some embodiments, one or more components of system 600 may be integrated on-chip with one another. The integration may be monolithic or heterogeneous. As just one example, optical waveguide 604, modulator 606, modulator controller 608, and optical receiver 100 may be monolithically integrated on-chip through a standard CMOS process, and an off-chip light source 602 may be coupled to the other components of system 700 through couplers (e.g., vertical grating or edge couplers). However, embodiments are not limited in this respect. Components of system 700 may be implemented and coupled together by any means known of one to ordinary skill in the art or otherwise suitable for implementing and coupling components of an optical data communication system.

Embodiments of light source 602 provide optical signals which propagate through optical waveguide 604. Light source 602 may be, for example, a laser, a light emitting diode (LED), or any other source of optical signals known to one of ordinary skill in the art or otherwise suitable for use in an optical data communication system. In some embodiments, light source 602 may provide optical signals having wavelengths between approximately 1260 nm to 1350 nm, or wavelengths between approximately 1560 nm to 1630 nm. However, embodiments of light source 602 are not limited in this regard. Light source 602 may provide optical signals having any wavelengths suitable for propagation through an optical waveguide 604 (e.g., a silicon waveguide), including (but not limited to) wavelengths between 1100 nm and 1600 nm.

Embodiments of optical waveguide 604 may include structures which guide the optical signals provided by light source 602. Optical waveguide 604 may be, for example, a strip waveguide, a rib waveguide, a segmented waveguide, and/or a photonic crystal waveguide. The transmission loss of optical waveguide 604 may be, for example, between 0.1 dB/cm and 3 dB/cm, between 1 dB/cm and 3 dB/cm, or between 2 dB/cm and 3 dB/cm. In some embodiments, optical waveguide 604 may be formed from silicon, polysilicon, and/or other silicon-based materials. Embodiments of optical waveguide 604 that are formed from silicon may be formed in the body silicon layer of the front-end of a standard CMOS process. Embodiments of optical waveguide 604 that are formed from polysilicon may be formed in the gate-polysilicon layer of the front-end of a standard CMOS process. In embodiments where the optical waveguide is formed from a silicon-based material, system 700 may be a silicon photonic system. In some embodiments, the transmission loss of an optical waveguide (e.g., silicon) may be reduced to an acceptable level (e.g., less than 3 dB/cm) using techniques known to one of ordinary skill in the art, such as partially undercutting the waveguide (e.g., removing some of the silicon surrounding the waveguide so that the portions of the waveguide are suspended) and filling the area around the waveguide with a substance that has low transmission loss, or removing the substrate and covering the waveguide with a material that has low transmission loss.

Embodiments of optical waveguide 604 may propagate a single optical signal at a time, or propagate multiple optical signals of different wavelengths simultaneously. Simultaneous propagation of multiple optical signals of different wavelengths may be carried out in accordance with a wavelength-division multiplexing (WDM) protocol. When multiple optical signals of different wavelengths simultaneously propagate through optical waveguide 604, the communication bandwidth of the optical waveguide may exceed 10 Gb/s, 100 Gb/s, or 1 Tb/s.

Embodiments of optical modulator 606 encode data (e.g., binary data) in an optical signal propagating through waveguide 604 by modulating one or more properties of the optical signal, such as the signal's phase, amplitude, frequency, or polarization. Some embodiments may modulate an optical signal by changing an optical property of waveguide 604, such as the waveguide's absorption coefficient or refractive index. Embodiments of optical modulator 606 may control changes in the optical properties of waveguide 604 using electro-optic modulation, acousto-optic modulation, magneto-optic modulation, thermo-optic modulation, mechano-optic modulation, or any other modulation technique known to one of ordinary skill in the art or otherwise suitable for controlling a waveguide's optical properties.

Embodiments of optical modulator 106 may include any structure that modulates an optical signal propagating through optical waveguide 604 in response to the concentration of free carriers in a portion of the optical modulator. For example, embodiments of optical modulator 606 may include a carrier-concentration controller, such as a MOS capacitor, a PIN diode, or a PN-junction diode. In some embodiments, the drive strength of the optical modulator (e.g., the level of the current entering or leaving a terminal of the optical modulator, or the level of the current passing through the modulator's carrier-concentration controller) may determine the rate at which free carriers are injected into, depleted from, or accumulated in a portion of the optical modulator, thereby controlling the modulator's operation.

Embodiments of modulator controller 108 may control the operation of optical modulator 606. In some embodiments, modulator controller 608 may receive input signals (e.g., electrical input signals) indicative of data to be encoded in the optical signals propagating through waveguide 604. Based on the input signals, modulator controller 608 may provide a control signal to modulator 606, thereby controlling modulator 606 to modulate an optical signal propagating through waveguide 604 such that the optical signal encodes the data. Modulator controller 608 may provide the control input to modulator 606 in any suitable form, including but not limited to an electrical signal, an acoustic signal, a magnetic signal, or a thermal signal.

Embodiments of optical receiver 100 may receive, via waveguide 604, optical signals encoded with data (e.g., binary data), and may produce electrical signals encoding the same data. Embodiments of optical receiver 100 are described above.

FIG. 7B shows a block diagram of an optical data communication system 700, according to some embodiments. System 700 includes two chips 701a and 701b. Chip 701a includes an optical waveguide 604b, which is coupled to optical fibers 604a and 604c through grating couplers (e.g., vertical grating couplers) 602. Chip 701b includes an optical waveguide 604d, which is coupled to optical fibers 604c and 604e through grating couplers 602. In some embodiments, optical fibers 604a and 604e are coupled to lasers 602a and 602b (e.g., a continuous wave, multi-wavelength lasers), which collectively provide optical signals that propagate in both directions (left-to-right and right-to-left) through optical waveguides 604b and 604d. In some embodiments, optical waveguides 604b and 604d may be silicon-based waveguides fabricated, for example, using gate poly-silicon or the body of a silicon-on-insulator (SOI) substrate.

Chips 701a and 701b include resonant drop rings 704, each of which may be configured to form a notch filter that pulls optical signals in a selected wavelength-channel off the optical waveguide and into the resonant ring. Rings 704a and 704b are coupled to optical modulators 606a and 606b, respectively, which are coupled to modulator driver circuits 608a and 608b, respectively. When a modulator 606 tunes the resonance of its ring 704 to a selected wavelength channel, the light in that wavelength channel is confined to the ring 704 (i.e., prevented from traveling down the waveguide), thereby encoding an optical 0-bit in an optical signal. When modulator 606 detunes the resonance of its ring 704 from the selected wavelength channel, the light in that wavelength channel is permitted to travel down the waveguide, thereby encoding an optical 1-bit in an optical signal.

Rings 705a and 705b are coupled to optical receivers 100a and 100b, respectively. When a ring-tuning control block 609 tunes the resonance of a ring (e.g., ring 705a) to a selected wavelength channel, the optical signals in that wavelength channel are confined to the ring, thereby allowing the corresponding optical receiver (e.g., receiver 100a) to convert the data encoded in the optical signal to the electrical domain.

FIG. 8A shows a flowchart of a method of compensating for optical noise, according to some embodiments. At step 802 of the illustrated method, an optical signal (or a portion thereof) is converted to an electrical signal. Embodiments of step 802 may include any technique for producing an electrical signal indicative of the data encoded in a corresponding optical signal, including but not limited to techniques in which a photodetector coupled to an optical waveguide produces an electrical signal that encodes the same data as an optical signal propagating through the optical waveguide.

At step 804 of the illustrated method, a difference is determined, the difference being between the electrical signal produced at step 802 and a reference electrical signal representing a noise component of the electrical signal. In some embodiments, the difference is determined by a differential amplifier (e.g., a clocked differential amplifier; a clocked, integrating, differential amplifier, or a differential amplifier with integrating feedback). In some embodiments, the difference between the electrical signal produced at step 802 and the reference electrical signal may be a signal that is indicative of the data encoded in the optical signal and has a high signal to noise ratio (e.g., a signal to dark current noise ratio).

At step 806 of the illustrated method, the difference is compared to one or more thresholds. At step 808 of the illustrated method, at least a portion of a data signal is provided based on a result of comparing the difference determined at step 804 to the one or more thresholds. Methods of providing a data signal based on a result of comparing an electrical signal to one or more thresholds are illustrated in FIGS. 8B-8C and described in detail below.

FIG. 8B illustrates a method of providing a data signal based on a result of comparing an electrical signal level to a threshold level, according to some embodiments. In some embodiments, the method of FIG. 8B may be performed, for example, by an amplifier 202 or 302. At step 810 of the illustrated method, a level of the electrical signal is compared to a threshold level. Such a comparison may be performed using techniques or devices known to one or ordinary skill in the art or otherwise suitable for comparing a signal level to a threshold level, including but not limited to using a comparator device with a pre-determined or programmable threshold level.

If the signal level exceeds the threshold level, a first bit value (e.g., a 1-bit) is encoded in the data signal at step 812 of the illustrated method. In some embodiments, a 1-bit may be encoded in a data signal using techniques known to one of ordinary skill in the art or otherwise suitable for encoding a 1-bit in a data signal, including but not limited to pulling up a voltage level of the data signal (e.g., through a pull-up transistor such as a p-channel FET or n-channel FET) to a potential associated with a 1-bit, such as a 5V, 3.3V, 1.8V, 1.2V, 0.9V, or 0.5V.

If the signal level does not exceed the threshold level, a second bit value (e.g., a 0-bit) is encoded in the data signal at step 814 of the illustrated method. In some embodiments, a 0-bit may be encoded in a data signal using techniques known to one of ordinary skill in the art or otherwise suitable for encoding a 0-bit in a data signal, including but not limited to pulling down a voltage level of the data signal (e.g., through a pull-down transistor such as an n-channel FET) to a potential associated with a 0-bit, such as a ground potential or 0V.

FIG. 8C illustrates a method of providing a data signal based on a result of comparing an electrical signal level to one or more threshold levels, according to some embodiments. In some embodiments, the method of FIG. 8C may be performed, for example, using two amplifiers 202 or 302. In some embodiments, the method of FIG. 8C may implement differential feedback equalization (DFE).

At step 820 of the illustrated method, a level of the electrical signal is compared to a first threshold level and to a second threshold level. Such comparisons may be performed using techniques or devices known to one or ordinary skill in the art or otherwise suitable for comparing a signal level to a threshold level, including but not limited to using a comparator device with a pre-determined or programmable threshold level. If the signal level exceeds the first and second threshold levels, a first bit value (e.g., a 1-bit) is encoded in the data signal at step 824 of the illustrated method. If the signal level does not exceed the first threshold level and does not exceed the second threshold level (e.g., is less than the first and second threshold levels), a second bit value (e.g., a 0-bit) is encoded in the data signal at step 828 of the illustrated method. Otherwise (e.g., in the case where the signal level is between the first and second thresholds), a determination is made, based on the bit value most recently encoded in the data signal, to encode either the first bit value or the second bit value in the data signal (steps 830, 832, and 834 of the illustrated method). If the most recently encoded bit value was a 0-bit and the signal level is less than the first threshold level, the second bit value (e.g., a 0-bit) is encoded in the data signal at step 832 of the illustrated method. If the most recently encoded bit value was a 0-bit and the signal level is not less than the first threshold level, the first bit value (e.g., a 1-bit) is encoded in the data signal at step 832 of the illustrated method. On the other hand, if the most recently encoded bit value was not a 0-bit (e.g., it was a 1-bit) and the signal level is greater than the second threshold, the first bit-value (e.g., a 1-bit) is encoded in the data signal at step 834 of the illustrated method. If the most recently encoded bit value was not a 0-bit and the signal level is not greater than the second threshold, the second bit-value (e.g., a 0-bit) is encoded in the data signal at step 834 of the illustrated method.

FIG. 9 shows a flowchart of a method of converting optical data to electrical data, according to some additional embodiments. At step 902 of the illustrated method, first and second electrical signals corresponding, respectively, to first and second portions of an optical signal are obtained. The first and second electrical signals may be obtained using any techniques known to one of ordinary skill in the art or otherwise suitable for obtaining electrical signals corresponding to optical signals, including but not limited to using photodetection techniques or receiving the electrical signals from a device that uses photodetection techniques. In some embodiments, the first and second electrical signal may be obtained using one or more photodetectors coupled to one or more optical waveguides. For example, the first electrical signal may be obtained using a first photodetector coupled to an optical waveguide, and the second electrical signal may be obtained using a second photodetector coupled to an optical waveguide. In some embodiments, the first and second photodetectors may be coupled, respectively, the first and second branches of the optical waveguide. As another example, both electrical signals may be obtained using a same photodetector coupled to an optical waveguide.

At step 904 of the illustrated method, a first amplifier signal is provided based on the first electrical signal. The first amplifier signal encodes a first bit. In some embodiments, the first amplifier signal is provided by amplifying the first electrical signal. Amplification of the first electrical signal may be performed using techniques or devices known to one of ordinary skill in the art or otherwise suitable for amplifying an electrical signal, including but not limited to using an amplifier, such as a clocked amplifier, to amplify the electrical signal.

At step 906 of the illustrated method, a second amplifier signal is provided based on the second electrical signal. The second amplifier signal encodes a second bit. In some embodiments, the second amplifier signal is provided by amplifying the second electrical signal. Amplification of the second electrical signal may be performed using techniques or devices known to one of ordinary skill in the art or otherwise suitable for amplifying an electrical signal, including but not limited to using an amplifier, such as a clocked amplifier, to amplify the electrical signal.

At step 908 of the illustrated method, a data signal which includes the first amplifier signal and/or the second amplifier signal is provided. In some embodiments, the data signal may be obtained by combining the first and second amplifier signals (e.g., by multiplexing the first and second amplifier signals onto a transmission line). In some embodiments, the first and second amplifier signals may be combined such that the data signal includes the first and second amplifier signals, and the data rate of the data signal is higher than the data rates of the first and second amplifier signals (e.g., the data rate of the data signal may be double the data rate of either amplifier signal, or may be a sum of the data rates of the amplifier signals).

In some embodiments, the data signal may be obtained by selecting the first or second amplifier signal (e.g., by multiplexing the first or second amplifier signal onto a transmission line). In some embodiments, the signal selection may performed according to a decision-feedback equalization (DFE) technique. For example, in some embodiments, the first amplifier signal may be selected in a case where the data signal's most recently encoded bit has a first value (e.g., a 0-bit), and the second amplifier signal may be selected in a case where the data signal's most recently encoded bit has a second value (e.g., a 1-bit).

Some embodiments of optical receiver 100, including but not limited to the embodiments of FIGS. 2A-2G, may operate at data rates up to 3.5 Gb/s or 4.0 Gb/s with sensitivities lower than 10 µA. Some embodiments of optical receiver 100, including but not limited to the embodiments of FIGS. 2B-2G, may operate at data rates up to 7.5 Gb/s with sensitivities lower than 20 µA. Some embodiments of optical receiver 100, including but not limited to the embodiments of FIGS. 2B-2D, may operate at data rates up to 7.5 Gb/s with sensitivities lower than 10 µA. In some embodiments, the chip area occupied by a circuit portion of optical receiver 100 in a 45-nm SOI process may be less than or equal to 108 $\mu m^2$. In some embodiments, the chip area occupied by a photodetector 103, such as a photodiode, in a 45-nm SOI process may be less than or equal to 416 $\mu m^2$.

Embodiments of the devices and techniques described herein may be used in a broad range of applications and/or devices, including but not limited to on-chip optical links, chip-to-chip optical links, multi-socket processor coherency traffic interfaces, processor-to-DRAM interfaces, network routers, field-programmable gate arrays (FPGAs), circuit board interconnects, backplane interconnects, rack interconnects, data center interconnects, digital system interconnects (e.g., Fibre-Channel, PCIExpress, GigabitEthernet, etc.), network routers, telecommunication switches, line cards (e.g., circuits that interface with a telecommunication access network), microprocessors (e.g., multi-core or many-core processors), and consumer electronic devices (e.g., handheld computers, laptop computers, desktop computers, tablet computers, smart phones, televisions, and displays).

References are made above to '0-bit' or '1-bit' values, or signals encoding a '0-bit' or a '1-bit.' One of ordinary skill in the art will understand that digital electronic devices may discriminate between signal values that correspond to binary digits 0 and 1. Embodiments are not limited by the voltages or other signal values which may be used to represent, encode, decode, or distinguish binary digits.

Embodiments are not limited to monolithic integration in a standard CMOS process. In some embodiments, the devices described herein may be fabricated in a non-standard CMOS process, a heterogeneous fabrication process, or any other integrated circuit fabrication process known to one of ordinary skill in the art.

The term 'light' as used herein, and the optical signals referenced herein, are not limited to visible light. In some embodiments, the optical signals used for optical data communication (e.g., the optical signals detected by a photodetector) may have wavelengths in the visible, near-infrared, infrared, and/or ultraviolet portions of the electromagnetic spectrum. In some embodiments, the optical signals of an optical data communication technology may have wavelengths of at least 400 nm. In some embodiments, optical signals may have wavelengths of at least 1100 nm. Embodiments may not be limited in this regard.

(D1) Some embodiments provide for an optical receiver, comprising: a first photodetector coupled to an optical waveguide, the optical waveguide being configured to provide an optical signal encoding data; a second photodetector; and an amplifier circuit configured to provide an electrical output signal encoding the data based, at least in part, on a first photodetection signal received from the first photodetector and on a second photodetection signal received from the second photodetector.

(D2) Some embodiments provide for the optical receiver of D1, wherein: the second photodetection signal represents a noise component of the first photodetection signal; and the amplifier circuit includes a differential amplifier with a first terminal and a second terminal, the first and second terminals being coupled to receive the first and second photodetection signals, respectively.

(D3) Some embodiments provide for the optical receiver of D2, wherein the differential amplifier is a first amplifier, and wherein: the optical receiver further comprises a third photodetector coupled to the optical waveguide, the amplification circuit further includes a second amplifier coupled to receive a third photodetection signal from the third photodetector, and the electrical output signal is further based, at least in part, on the third photodetection signal received from the third photodetector.

(D4) Some embodiments provide for the optical receiver of D3, wherein: the electrical output signal includes at least a portion of a first amplifier signal provided by the differential amplifier and at least a portion of a second amplifier signal provided by the second amplifier, and a data rate of the electrical output signal is approximately a sum of data rates of the first and second amplifier signals.

(D5) Some embodiments provide for the optical receiver of D3, wherein: when a most recently encoded bit in the electrical output signal has a first bit value, a next bit to be encoded in the electrical output signal is provided by the first amplifier, and when the most recently encoded bit in the electrical output signal has a second bit value, the next bit to be encoded in the electrical output signal is provided by the second amplifier.

(D6) Some embodiments provide for the optical receiver of D3, wherein the first amplifier and the second amplifier are configured to perform decision-feedback equalization.

(D7) Some embodiments provide for the optical receiver of D2, wherein the optical waveguide is a first optical waveguide, wherein the optical signal is a first optical signal, wherein the differential amplifier is a first amplifier, and wherein: the optical receiver further comprises a third photodetector coupled to a second optical waveguide, the second optical waveguide being configured to provide a second optical signal encoding the data, the amplification circuit further includes a second amplifier coupled to receive a third photodetection signal from the third photodetector, and the electrical output signal is further based, at least in part, on the third photodetection signal received from the third photodetector.

(D8) Some embodiments provide for the optical receiver of D7, wherein: the electrical output signal includes at least a portion of a first amplifier signal provided by the first amplifier and at least a portion of a second amplifier signal provided by the second amplifier, and a data rate of the electrical output signal is approximately a sum of data rates of the first and second amplifier signals.

(D9) Some embodiments provide for the optical receiver of D7, wherein: when a most recently encoded bit in the electrical output signal has a first bit value, a next bit to be encoded in the electrical output signal is provided by the first amplifier, and when the most recently encoded bit in the electrical output signal has a second bit value, the next bit to be encoded in the electrical output signal is provided by the second amplifier.

(D10) Some embodiments provide for the optical receiver of D7, wherein the first amplifier and the second amplifier are configured to perform decision-feedback equalization.

(D11) Some embodiments provide for the optical receiver of D2, further comprising a structure located between the first and second photodetectors, the structure being configured to prevent cross-talk between the first and second photodetectors.

(D12) Some embodiments provide for the optical receiver of D11, wherein the structure includes a metallic material.

(D13) Some embodiments provide for the optical receiver of D1, wherein: the second photodetector is coupled to the optical waveguide; the amplification circuit includes a first amplifier and a second amplifier, the first and second amplifiers being coupled to receive the first and second photodetection signals, respectively; and the electrical output signal includes at least a portion of a first amplifier signal provided by the first receiver and at least a portion of a second amplifier signal provided by the second amplifier.

(D14) Some embodiments provide for the optical receiver of D1, wherein the optical waveguide is a first optical waveguide, wherein the optical signal is a first optical signal, and wherein: the second photodetector is coupled to a second optical waveguide, the second optical waveguide being configured to provide a second optical signal encoding the data; the amplification circuit includes a first amplifier and a second amplifier, the first and second amplifiers being coupled to receive the first and second photodetection signals, respectively; the electrical output signal includes at least a portion of a first amplifier signal provided by the first amplifier and at least a portion of a second amplifier signal provided by the second amplifier.

(D15) Some embodiments provide for the optical receiver of D1, wherein the amplification circuit includes a latching sense amplifier.

(D16) Some embodiments provide for the optical receiver of D15, wherein the latching sense amplifier is an integrating amplifier.

(D17) Some embodiments provide for the optical receiver of D1, wherein the first photodetector, the second photodetector, the optical waveguide, and the amplification circuit are monolithically integrated on a semiconductor substrate.

(D18) Some embodiments provide for the optical receiver of D1, wherein the first photodetector is a photodiode.

(D19) Some embodiments provide for the optical receiver of D18, wherein: the photodiode is a PIN photodiode, and an intrinsic region of the PIN photodiode is formed by a portion of the optical waveguide.

(D20) Some embodiments provide for the optical receiver of D19, wherein the portion of the optical waveguide which forms the intrinsic region of the PIN diode is part of a resonant ring.

(D21) Some embodiments provide for the optical receiver of D18, wherein: the photodiode is a PN junction photodiode, and a p-doped region and a n-doped region of the PN junction photodiode are adjacent to the optical waveguide.

(D22) Some embodiments provide for the optical receiver of D1, wherein: the first and second photodetectors are PN junction photodiodes, the first and second photodetectors include interdigitated p-doped regions and n-doped regions adjacent to the optical waveguide.

Various aspects of the apparatus and techniques described herein may be used alone, in combination, or in a variety of arrangements not specifically discussed in the embodiments described in the foregoing description. Embodiments of the present disclosure are therefore not limited to the details and arrangement of components set forth in the foregoing description or illustrated in the drawings. For example, aspects described in one embodiment may, be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements, and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., as "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. An optical receiver, comprising:
  a photodetection circuit coupled to an optical waveguide, the optical waveguide being configured to provide an optical signal; and
  an amplification circuit, including:
    a first amplifier configured to provide a first amplifier signal based on a first photodetection signal provided by the photodetection circuit, the first photodetection signal corresponding to a first portion of the optical signal, the first amplifier signal having a first data rate, and
    a second amplifier configured to provide a second amplifier signal based on a second photodetection signal provided by the photodetection circuit, the second photodetection signal corresponding to a second portion of the optical signal, the second amplifier signal having a second data rate,
  wherein the amplification circuit is configured to provide an electrical data signal by combining the first and second amplifier signals, the electrical data signal having a third data rate that is greater than each of the first and second data rates.

2. The optical receiver of claim 1, wherein:
  the third data rate is approximately a sum of the first data rate and the second data rate.

3. The optical receiver of claim 1, wherein:
  the first amplifier signal encodes a first bit and the second amplifier signal encodes and second bit, and when the second bit has a first bit value, a next bit to be encoded in the electrical data signal is provided by the first amplifier, and
  when the second bit has a second bit value, the next bit to be encoded in the electrical data signal is provided by the second amplifier.

4. The optical receiver of claim 1, wherein the first amplifier and the second amplifier are configured to perform decision-feedback equalization.

5. The optical receiver of claim 1, wherein the first amplifier is an integrating amplifier.

6. The optical receiver of claim 1, wherein the photodetection circuit, the optical waveguide, and the amplification circuit are monolithically integrated on a semiconductor substrate.

7. The optical receiver of claim 1, wherein the photodetection circuit includes a photodetector configured to convert the first portion of the optical signal into the first photodetection signal, and to convert the second portion of the optical signal into the second photodetection signal.

8. The optical receiver of claim 7, wherein the photodetector is a photodiode.

9. The optical receiver of claim 1, wherein the photodetection circuit includes:
  a first photodetector configured to convert the first portion of the optical signal into the first photodetection signal, and
  a second photodetector configured to convert the second portion of the optical signal into the second photodetection signal.

10. The optical receiver of claim 9, wherein the first and second photodetectors are coupled to the optical waveguide.

11. The optical receiver of claim 9, wherein:
  the first photodetector is coupled to a first branch of the optical waveguide, the second photodetector is coupled to a second branch of the optical waveguide, and the first and second branches of the optical waveguide are configured to provide, respectively, the first and second portions of the optical signal.

12. The optical receiver of claim 9, wherein the first photodetector is a photodiode.

13. The optical receiver of claim 1, wherein the photodetection circuit is configured to convert the first portion of the optical signal into the first photodetection signal, and to convert the second portion of the optical signal into the second photodetection signal.

14. A method comprising:
obtaining a first electrical signal and a second electrical signal, the first electrical signal corresponding to a first portion of the optical signal, the second electrical signal corresponding to a second portion of the optical signal;
with a first amplifier, providing a first amplifier signal based on the first electrical signal, the first amplifier signal having a first data rate;
with a second amplifier, providing a second amplifier signal based on the second electrical signal, the second amplifier signal having a second data rate; and
providing a data signal including the first amplifier signal and the second amplifier signal the data signal having a third data rate that is greater than each of the first and second data rates.

15. The method of claim 14, wherein obtaining the first electrical signal comprises converting the first portion of the optical signal into the first electrical signal.

16. The method of claim 14, wherein:
providing the data signal comprises providing the data signal including the first and second amplifier signals, and
the third data rate is approximately a sum of the first and second data rates.

17. The method of claim 14, wherein providing the data signal comprises:
in a case where a most recently encoded bit of the data signal has a first bit value, providing the data signal including the first amplifier signal, and
in a case where the most recently encoded bit of the data signal has a second bit value, providing the data signal including the second amplifier signal.

18. The method of claim 14, further comprising performing decision-feedback equalization with the first and second amplifiers.

19. The method of claim 14, wherein the first amplifier is a clocked amplifier.

20. The method of claim 14, wherein the photodetection circuit, the optical waveguide, and the first and second amplifiers are monolithically integrated on a semiconductor substrate.

* * * * *